United States Patent
Abedini et al.

(10) Patent No.: US 11,546,825 B2
(45) Date of Patent: Jan. 3, 2023

(54) TECHNIQUES FOR MULTIPLE TRANSMISSION/RECEPTION POINT (MULTI-TRP) OPERATION VIA REPEATERS

(71) Applicant: QUALCOMM Incorporated, San Diego, CA (US)

(72) Inventors: Navid Abedini, Somerset, NJ (US); Junyi Li, Chester, NJ (US); Ashwin Sampath, Skillman, NJ (US)

(73) Assignee: QUALCOMM incorporated, San Diego, CA (US)

( * ) Notice: Subject to any disclaimer, the term of this patent is extended or adjusted under 35 U.S.C. 154(b) by 174 days.

(21) Appl. No.: 17/003,393

(22) Filed: Aug. 26, 2020

(65) Prior Publication Data
US 2021/0112479 A1    Apr. 15, 2021

Related U.S. Application Data

(60) Provisional application No. 62/912,849, filed on Oct. 9, 2019.

(51) Int. Cl.
*H04W 40/12* (2009.01)
*H04B 7/155* (2006.01)

(52) U.S. Cl.
CPC ............ *H04W 40/12* (2013.01); *H04B 7/155* (2013.01)

(58) Field of Classification Search
None
See application file for complete search history.

(56) References Cited

U.S. PATENT DOCUMENTS

| | | | | |
|---|---|---|---|---|
| 2008/0108369 A1* | 5/2008 | Visotsky | ............. | H04W 72/085 455/455 |
| 2009/0185492 A1* | 7/2009 | Senarath | ............... | H04L 45/122 370/238 |
| 2009/0257386 A1* | 10/2009 | Achir | .................... | H04W 40/16 370/329 |
| 2013/0163412 A1* | 6/2013 | Hughes | ................. | H04W 40/04 370/228 |
| 2018/0123683 A1* | 5/2018 | Wakabayashi | ........ | H04W 40/34 |

FOREIGN PATENT DOCUMENTS

| | | |
|---|---|---|
| CN | 104320334 A | 1/2015 |
| WO | WO-2009109076 A1 | 9/2009 |

OTHER PUBLICATIONS

International Search Report and Written Opinion—PCT/US2020/048208—ISAEPO—dated Nov. 12, 2020.

* cited by examiner

*Primary Examiner* — Brian S Roberts
(74) *Attorney, Agent, or Firm* — Dalei Dong; Holland & Hart LLP

(57) ABSTRACT

Methods, systems, and devices for wireless communications are described. In some examples, a base station may identify one or more communication paths to a user equipment (UE), and may determine an end-to-end signal quality for each communication path (e.g., a signal-to-noise ratio (SNR)), one or more hop SNR values for each hop of each communication path, a ratio of the hop SNR values and the end-to-end SNR of each communication path, or a combination thereof. Based on the determined SNR values, ratios, or both, the base station may select a first communication path for a first type of communications (e.g., uplink, downlink, signal type, or the like) and a second communication path for a second type of communications (e.g., uplink, downlink, signal type, or the like), and may communicate with the UE using the selected communication paths.

29 Claims, 20 Drawing Sheets

TECHNIQUES FOR MULTIPLE TRANSMISSION/RECEPTION POINT (MULTI-TRP) OPERATION VIA REPEATERS

CROSS REFERENCE

The present Application for Patent claims the benefit of U.S. Provisional Patent Application No. 62/912,849 by ABEDINI et al., entitled "MULTI-TRP OPERATION VIA REPEATERS," filed Oct. 9, 2019, assigned to the assignee hereof, and expressly incorporated by reference herein.

FIELD OF TECHNOLOGY

The following relates generally to wireless communications and more specifically to multiple transmission/reception point (multi-TRP) operation via repeaters.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Radio access technology (RAT) that uses millimeter waves, such as NR, may be subject to obstructions that prevent the passage of waves from a transmitting entity to a receiving entity. In such cases, a wireless communications system may include one or more repeaters to amplify and forward the received signal from the transmitting entity to the receiving entity.

SUMMARY

The described techniques relate to improved methods, systems, devices, and apparatuses that support multiple transmission/reception point (multi-TRP) operation via repeaters. In such systems, there may be multiple communication paths between a transmitting device and a receiving device, and at least some of those paths may include one or more repeaters. In some examples, a transmitting device may select a communication path in a multi-TRP system based on an end-to-end signal to noise ratio (SNR) of each communication path to improve the inefficiencies and decrease latency in a wireless communications system. In some examples, a base station may identify one or more communication paths to a user equipment (UE), and may determine an end-to-end SNR for each communication path, one or more hop SNR values for each hop of each communication path, a ratio of the hop SNR values and the end-to-end SNR of each communication path, or a combination thereof. Based on the determined SNR values, ratios, or both, the base station may select a first communication path for a first type of communications (e.g., uplink, downlink, signal type, or the like) and a second communication path for a second type of communications (e.g., uplink, downlink, signal type, or the like), and may communicate with the UE using the selected communication paths.

A method of wireless communications is described. The method may include identifying a first communication path with a UE and a second communication path with the UE, where the first communication path, the second communication path, or both includes one or more repeaters, determining a first end-to-end quality for the first communication path and a second end-to-end quality for the second communication path, where the first end-to-end quality and the second end-to-end quality each include at least a first hop quality associated with a first hop of the first communication path and the second communication path, selecting the first communication path for a first communication type for communications with the UE based on the first hop quality of the first end-to-end quality, the first end-to-end quality, a first ratio of the first hop quality for the first end-to-end quality and the first end-to-end quality, or a combination thereof, selecting the second communication path for a second communication type for communications with the UE based on the first hop quality of the second end-to-end quality, a second end-to-end quality, a second ratio of the first hop quality for the second end-to-end quality and the second end-to-end quality, or a combination thereof, and communicating with the UE, based on the selecting, via the first communication path, the second communication path, or both.

An apparatus for wireless communications is described. The apparatus may include a processor, memory coupled with the processor, and instructions stored in the memory. The instructions may be executable by the processor to cause the apparatus to identify a first communication path with a UE and a second communication path with the UE, where the first communication path, the second communication path, or both includes one or more repeaters, determine a first end-to-end quality for the first communication path and a second end-to-end quality for the second communication path, where the first end-to-end quality and the second end-to-end quality each include at least a first hop quality associated with a first hop of the first communication path and the second communication path, select the first communication path for a first communication type for communications with the UE based on the first hop quality of the first end-to-end quality, the first end-to-end quality, a first ratio of the first hop quality for the first end-to-end quality and the first end-to-end quality, or a combination thereof, select the second communication path for a second communication type for communications with the UE based on the first hop quality of the second end-to-end quality, a second end-to-end quality, a second ratio of the first hop quality for the second end-to-end quality and the second end-to-end quality, or a combination thereof, and communicate with the UE, based on the selecting, via the first communication path, the second communication path, or both.

Another apparatus for wireless communications is described. The apparatus may include means for identifying a first communication path with a UE and a second communication path with the UE, where the first communication path, the second communication path, or both includes one or more repeaters, determining a first end-to-end quality for the first communication path and a second end-to-end quality for the second communication path, where the first end-to-end quality and the second end-to-end quality each include at least a first hop quality associated with a first hop of the first communication path and the second communication path, selecting the first communication path for a first communication type for communications with the UE based on the first hop quality of the first end-to-end quality, the first end-to-end quality, a first ratio of the first hop quality for the first end-to-end quality and the first end-to-end quality, or a combination thereof, selecting the second communication path for a second communication type for communications with the UE based on the first hop quality of the second end-to-end quality, a second end-to-end quality, a second ratio of the first hop quality for the second end-to-end quality and the second end-to-end quality, or a combination thereof, and communicating with the UE, based on the selecting, via the first communication path, the second communication path, or both.

A non-transitory computer-readable medium storing code for wireless communications is described. The code may include instructions executable by a processor to identify a first communication path with a UE and a second communication path with the UE, where the first communication path, the second communication path, or both includes one or more repeaters, determine a first end-to-end quality for the first communication path and a second end-to-end quality for the second communication path, where the first end-to-end quality and the second end-to-end quality each include at least a first hop quality associated with a first hop of the first communication path and the second communication path, select the first communication path for a first communication type for communications with the UE based on the first hop quality of the first end-to-end quality, the first end-to-end quality, a first ratio of the first hop quality for the first end-to-end quality and the first end-to-end quality, or a combination thereof, select the second communication path for a second communication type for communications with the UE based on the first hop quality of the second end-to-end quality, a second end-to-end quality, a second ratio of the first hop quality for the second end-to-end quality and the second end-to-end quality, or a combination thereof, and communicate with the UE, based on the selecting, via the first communication path, the second communication path, or both.

Some examples of the method, apparatuses, and non-transitory computer-readable medium described herein may further include operations, features, means, or instructions for selecting the first communication path for uplink communications, where the first communication type includes uplink communications, and selecting the second communication path for downlink communications, where the second communication type includes downlink communications.

Some examples of the method, apparatuses, and non-transitory computer-readable medium described herein may further include operations, features, means, or instructions for configuring, based on selecting the first communication path for uplink communications, the one or more repeaters of the first communication path to receive one or more uplink signals from the UE and convey the one or more uplink signals to the base station, and configuring, based on selecting the second communication path for downlink communications, the one or more repeaters of the second communication path to receive one or more downlink signals from the base station and convey the one or more downlink signals to the UE.

Some examples of the method, apparatuses, and non-transitory computer-readable medium described herein may further include operations, features, means, or instructions for selecting the first communication path for a first type of downlink signal, where the first communication type includes the first type of downlink signal, and selecting the second communication path for a second type of downlink signal, where the second communication type includes the second type of downlink signal.

Some examples of the method, apparatuses, and non-transitory computer-readable medium described herein may further include operations, features, means, or instructions for determining that the first end-to-end quality, the first ratio, or a combination thereof, may be higher than the second end-to-end quality, the second ratio, or a combination thereof, where selecting the first communication path for the first type of downlink signal and selecting the second communication path for the second type of downlink signal may be based on the determining.

Some examples of the method, apparatuses, and non-transitory computer-readable medium described herein may further include operations, features, means, or instructions for transmitting, via the first communication path, the first type of downlink signal, and transmitting, via the second communication path, the second type of downlink signal.

In some examples of the method, apparatuses, and non-transitory computer-readable medium described herein, the first type of downlink signal includes data signaling.

In some examples of the method, apparatuses, and non-transitory computer-readable medium described herein, the second type of downlink signal includes broadcast signaling or control signaling.

In some examples of the method, apparatuses, and non-transitory computer-readable medium described herein, the second communication path includes the one or more repeaters, and where the first communication path includes a direct link between the base station and the UE.

Some examples of the method, apparatuses, and non-transitory computer-readable medium described herein may further include operations, features, means, or instructions for selecting the first communication path for a first signal, where the first communication type includes a first copy of the first signal, and selecting the second communication path for the first signal, where the second communication type includes a second copy of the first signal.

Some examples of the method, apparatuses, and non-transitory computer-readable medium described herein may further include operations, features, means, or instructions for selecting the first communication path for a first set of signals, where the first communication type includes a first communication stream, and selecting the first communication path for a second set of signals that may be different from the first set of signals, where the second communication type includes a second communication stream.

Some examples of the method, apparatuses, and non-transitory computer-readable medium described herein may further include operations, features, means, or instructions for selecting the first communication path for communicating with the UE, where the first communication type includes an active communication mode, and selecting the second communication path for backup communications when communications via the first communication paths fail, where the second communication type includes a backup communication mode.

In some examples of the method, apparatuses, and non-transitory computer-readable medium described herein, determining the first end-to-end quality for the first communication path may include operations, features, means, or instructions for determining a first SNR for the first communication path, where determining the second end-to-end quality for the second communication path.

A method of wireless communications at a repeater is described. The method may include communicating between a base station and a UE via a first communication path including the repeater, where the first communication path corresponds to a first end-to-end quality and a second communication path between the base station and UE that does not include the repeater corresponds to a second end-to-end quality, where the first end-to-end quality and the second end-to-end quality each include at least a first hop quality associated with a first hop of the first communication path and the second communication path, receiving, at the repeater in the first communication path, a configuration message from the base station, where receiving the configuration message is based on any combination of the first hop quality of the first end-to-end quality, the first end-to-end quality, a first ratio of the first hop quality for the first end-to-end quality and the first end-to-end quality, the first hop quality of the second end-to-end quality, the second end-to-end quality, and a second ratio of the first hop quality for the second end-to-end quality and the second end-to-end quality, adjusting a configuration status of the repeater, based on the configuration message, to perform a communication type corresponding to communications between the UE and the base station, and relaying one or more signals between the UE and the base station, based on the adjusting, according to the communication type.

An apparatus for wireless communications at a repeater is described. The apparatus may include a processor, memory coupled with the processor, and instructions stored in the memory. The instructions may be executable by the processor to cause the apparatus to communicate between a base station and a UE via a first communication path including the repeater, where the first communication path corresponds to a first end-to-end quality and a second communication path between the base station and UE that does not include the repeater corresponds to a second end-to-end quality, where the first end-to-end quality and the second end-to-end quality each include at least a first hop quality associated with a first hop of the first communication path and the second communication path, receive, at the repeater in the first communication path, a configuration message from the base station, where receiving the configuration message is based on any combination of the first hop quality of the first end-to-end quality, the first end-to-end quality, a first ratio of the first hop quality for the first end-to-end quality and the first end-to-end quality, the first hop quality of the second end-to-end quality, the second end-to-end quality, and a second ratio of the first hop quality for the second end-to-end quality and the second end-to-end quality, adjust a configuration status of the repeater, based on the configuration message, to perform a communication type corresponding to communications between the UE and the base station, and relay one or more signals between the UE and the base station, based on the adjusting, according to the communication type.

Another apparatus for wireless communications at a repeater is described. The apparatus may include means for communicating between a base station and a UE via a first communication path including the repeater, where the first communication path corresponds to a first end-to-end quality and a second communication path between the base station and UE that does not include the repeater corresponds to a second end-to-end quality, where the first end-to-end quality and the second end-to-end quality each include at least a first hop quality associated with a first hop of the first communication path and the second communication path, receiving, at the repeater in the first communication path, a configuration message from the base station, where receiving the configuration message is based on any combination of the first hop quality of the first end-to-end quality, the first end-to-end quality, a first ratio of the first hop quality for the first end-to-end quality and the first end-to-end quality, the first hop quality of the second end-to-end quality, the second end-to-end quality, and a second ratio of the first hop quality for the second end-to-end quality and the second end-to-end quality, adjusting a configuration status of the repeater, based on the configuration message, to perform a communication type corresponding to communications between the UE and the base station, and relaying one or more signals between the UE and the base station, based on the adjusting, according to the communication type.

A non-transitory computer-readable medium storing code for wireless communications at a repeater is described. The code may include instructions executable by a processor to communicate between a base station and a UE via a first communication path including the repeater, where the first communication path corresponds to a first end-to-end quality and a second communication path between the base station and UE that does not include the repeater corresponds to a second end-to-end quality, where the first end-to-end quality and the second end-to-end quality each include at least a first hop quality associated with a first hop of the first communication path and the second communication path, receive, at the repeater in the first communication path, a configuration message from the base station, where receiving the configuration message is based on any combination of the first hop quality of the first end-to-end quality, the first end-to-end quality, a first ratio of the first hop quality for the first end-to-end quality and the first end-to-end quality, the first hop quality of the second end-to-end quality, the second end-to-end quality, and a second ratio of the first hop quality for the second end-to-end quality and the second end-to-end quality, adjust a configuration status of the repeater, based on the configuration message, to perform a communication type corresponding to communications between the UE and the base station, and relay one or more signals between the UE and the base station, based on the adjusting, according to the communication type.

Some examples of the method, apparatuses, and non-transitory computer-readable medium described herein may further include operations, features, means, or instructions for relaying one or more uplink messages from the UE to the base station, where the communication type includes uplink communications.

Some examples of the method, apparatuses, and non-transitory computer-readable medium described herein may further include operations, features, means, or instructions for relaying one or more downlink messages from the base station to the UE, where the communication type includes downlink communications.

Some examples of the method, apparatuses, and non-transitory computer-readable medium described herein may further include operations, features, means, or instructions for relaying, from the base station to the UE, a downlink broadcast signal, a downlink control signal, or a downlink data signal, where the communication type includes a type of downlink signal.

Some examples of the method, apparatuses, and non-transitory computer-readable medium described herein may further include operations, features, means, or instructions for relaying, between the UE and the base station, a first copy of a signal, where the communication type includes the first copy of the signal.

Some examples of the method, apparatuses, and non-transitory computer-readable medium described herein may further include operations, features, means, or instructions for relaying, between the UE and the base station, a first set of signals, where the communication type includes a first communication stream.

Some examples of the method, apparatuses, and non-transitory computer-readable medium described herein may further include operations, features, means, or instructions for relaying, between the UE and the base station, a set of one or more signals, where the communication type includes an active communication mode.

Some examples of the method, apparatuses, and non-transitory computer-readable medium described herein may further include operations, features, means, or instructions for relaying, between the UE and the base station, a subset of a set of one or more signals, the subset having been unsuccessfully transmitted via a different communication path that does not include the repeater, where the communication type includes a backup communication mode.

In some examples of the method, apparatuses, and non-transitory computer-readable medium described herein, the first end-to-end quality for the first communication path includes a first SNR for the first communication path, where the second end-to-end quality for the second communication path includes a second SNR for the second communication path, and where the first hop quality includes a first hop SNR.

DETAILED DESCRIPTION

In some wireless communications systems, a transmitting device may use millimeter waves to communicate with a receiving device. Obstacles between the transmitting device and receiving device may prevent these millimeter wave signals from reaching the receiving device. The use of repeaters in a multiple transmission-reception point (multi-TRP) system may allow the signals to bypass obstructions and extend the reach of a transmitting device. Multiple repeaters may relay one or more signals to one or more receiving devices. Each link in a communication path between a transmitting device and a receiving device may be referred to as a hop. For example, there may be a hop between the transmitting device and the repeater, intermediate repeaters, and the repeater and the receiving device.

In a multi-TRP system, the transmitting device (e.g., a base station) may send a signal in a first hop to one or more repeaters that will amplify and redirect the signal in a second hop to one or more receiving devices (e.g., a UE or another repeater). The amplification of the signal may result in an amplification in the noise associated with the received signal and internal feedback loop of the repeater. The noise in the signal may decrease the end-to-end SNR, thus causing errors in signal transmissions, which may increase latency and inefficiencies to the system. Each hop in the wireless communications system may affect the end-to-end SNR of a communication path by a different magnitude. Specifically, the first hop in a communication path may impact the end-to-end SNR more than the other hops. Thus, the transmitter may consider the SNR of each hop in a communication path to optimize signal transmission for different communication types.

In some cases, a base station may select different communication paths for uplink and downlink communications based on end-to-end SNRs of the communication paths, the SNR values of one or more hops in each communication path, or both. In some examples, the base station may select different communication paths for different types of communication (e.g., data signals, control signals, broadcast signals, etc.).

Aspects of the disclosure are initially described in the context of wireless communications systems. Aspects of the disclosure are further illustrated by and described with reference to wireless communications systems, baseline architectures, and process flows. Aspects of the disclosure are further illustrated by and described with reference to apparatus diagrams, system diagrams, and flowcharts that relate to techniques for multi-TRP operation via repeaters.

Figure 1:
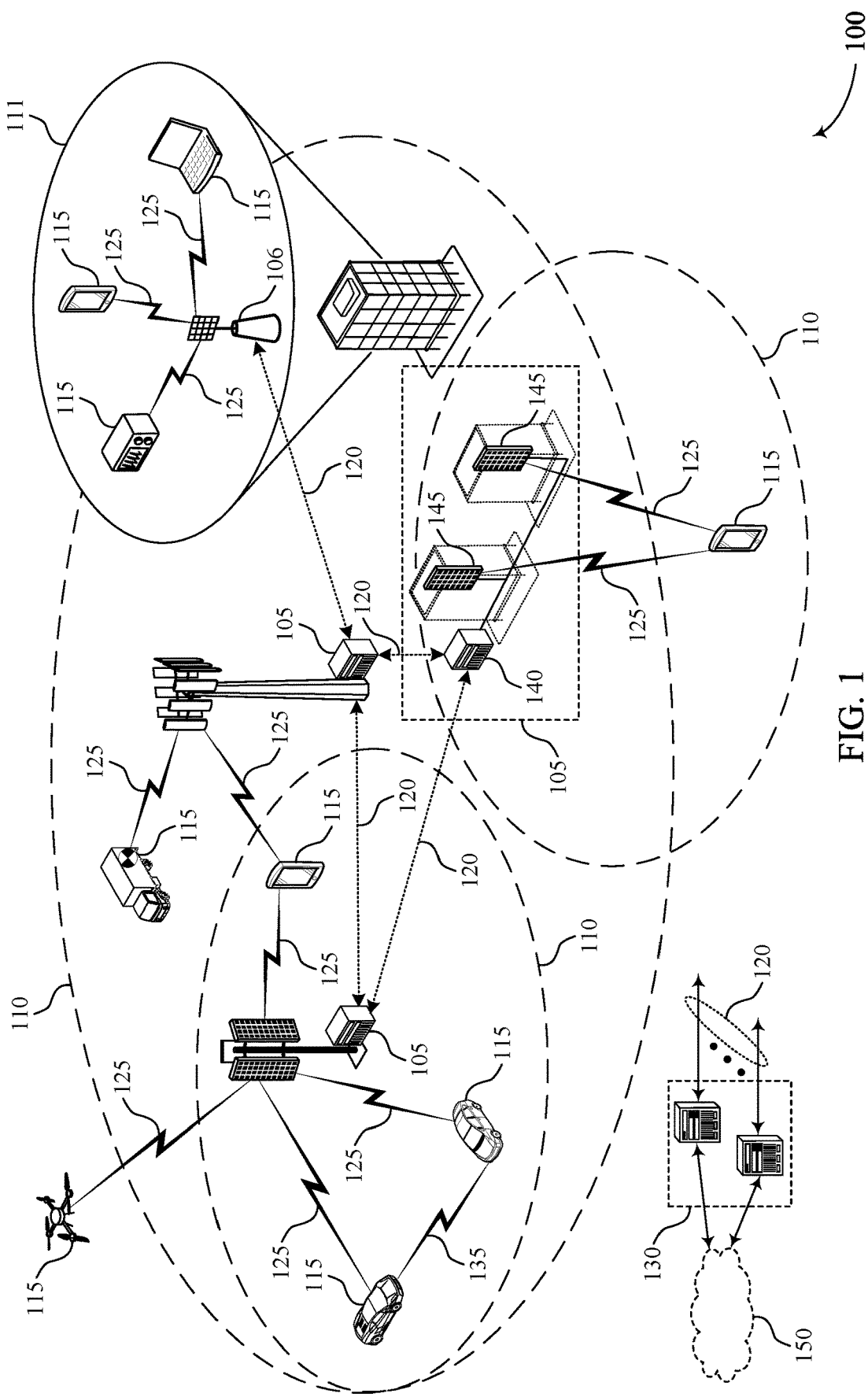
FIG. 1 illustrates an example of a system for wireless communications that supports techniques for multiple transmission reception point (multi-TRP) operation via repeaters in accordance with aspects of the present disclosure.

FIG. 1 illustrates an example of a wireless communications system 100 that supports techniques for multi-TRP operation via repeaters in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or reception beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmission beam, a reception beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different reception beamforming weight sets (e.g., different directional listening weight sets) applied to signals received at multiple antenna elements of an antenna array, or by processing received signals according to different reception beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may include repeaters 106 to extend the coverage of base stations 105. Repeaters 106 may reduce the effects of propagation loss and signal blockage in a cell by filling coverage holes, especially for mmW communications or other high-frequency applications. A repeater 106 may be configured to receive a signal (e.g., an analog signal, an mmW signal, etc.) from a first wireless device (e.g., a base station 105 or a UE 115), amplify the power of the received signal, and transmit the amplified signal to a second wireless device (e.g., a UE 115 or a base station 105). The repeater 106 may be equipped with multiple antennas, which may be used to employ techniques such as beamforming.

Each repeater 106 may provide a coverage area 111 over which UEs and the repeater 106 may establish one or more communication links 125. The coverage area 111 may be an example of a geographic area over which a repeater 106 and a UE 115 may support the communication of signals according to one or more radio access technologies. The repeater 106 may communicate with a base station 105, for example via a wireless backhaul link 120, and facilitate communications between the UEs 115 in the coverage area 111 with the base station 105, in order to extend the coverage of the base station 105 to include the coverage area 111.

A repeater 106 may include a control interface for receiving and processing control signals from a base station 105. In some examples, the repeater 106 may receive control signals via an out of band transmission, which may be transmitted using a radio technology (e.g., Bluetooth) or a frequency (e.g., NB-IoT, a frequency below 6 GHz, etc.) that is different from the radio technology or frequency used for receiving and transmitting signals (e.g., mmW communications). In some examples, the repeater 106 may receive control signals via an in band transmission, for example using a BWP that is smaller than the bandwidth used for receiving and transmitting signals.

The wireless communications system 100 may include devices (e.g., base stations 105, repeaters 106, and UEs 115) that may be capable of multi-TRP operations. The multi-TRP operations may increase capacity or reliability of the system. An example of the operation may include a base station 105 transmitting a signal, or signals, to the repeaters 106. The repeaters 106 may then amplify and redirect the signals to the UE 115. The path used for sending a signal from base station 105 to UE 115 may be referred to as a communication path. The base station 105 may be able to select which communication path to use for different types of signals. The base station 105 may compare one or more SNR ratios, including the end-to-end SNR and the first hop SNR for a communication path, to select a communication path.

By selecting a communication path based on SNRs of the individual hops as well as the SNR of the entire path, a base station 105 may select communication paths for certain types of transmissions to increase the efficiency of a wireless communications system. For example, the base station 105 may transmit control information over a communication path with a lower SNR than another communication path over which data may be transmitted, thereby efficiently leveraging the available resources in a wireless communications system.

Figure 2:
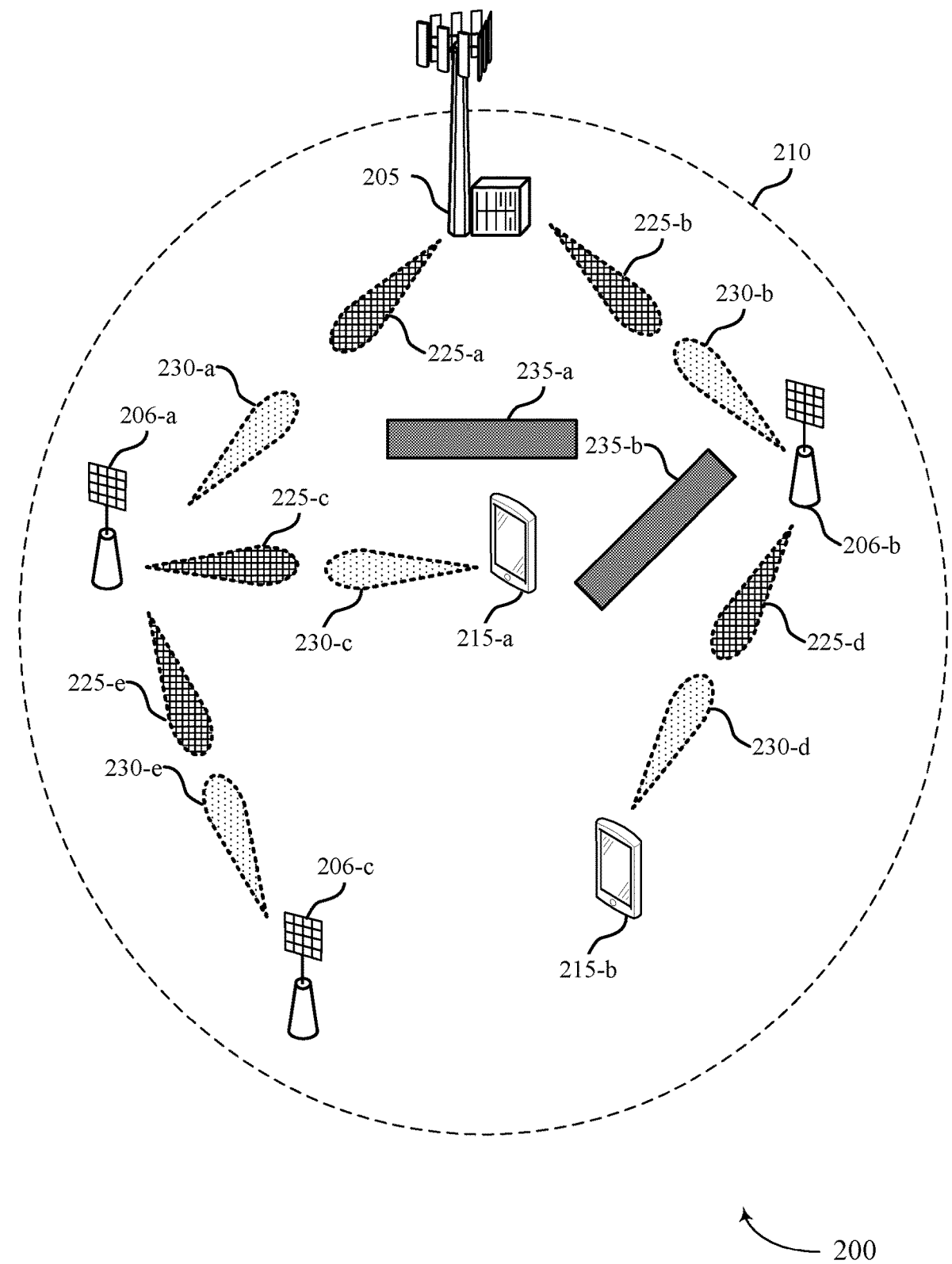
FIG. 2 illustrates an example of a wireless communications system that supports techniques for multi-TRP operation via repeaters in accordance with aspects of the present disclosure.

FIG. 2 illustrates an example of a wireless communications system 200 that supports techniques for multi-TRP operation via repeaters in accordance with aspects of the present disclosure. In some examples, wireless communications system 200 may implement aspects of wireless communications system 100. For example, the wireless communications system 200 may include a base station 205, one or more repeaters 206, and one or more UEs 215, which may be examples of the corresponding devices described with reference to FIG. 1. The wireless communications system 200 may include features for improved repeater operations, among other benefits.

In the wireless communications system 200, base station 205 may serve one or more UEs 215 located within a geographic coverage area 210. UEs 215 within the geographic coverage area 210 may transmit and receive communications as scheduled by base station 205. Devices in the wireless communications system 200 may use beamforming techniques to transmit using transmission beams 225, and receive transmissions using reception beams 230. The base station 205 may transmit in the mmW spectrum band, although the techniques described herein may be applied to transmissions in other frequency bands or using other RATs.

In some examples, as illustrated and described with respect to FIG. 2, base station 205 may not be able to communicate directly with UE 215-a or UE 215-b. For instance, obstructions 235-a and 235-b may block a direct communication path to one or more UEs 215. In some examples, obstructions 235-a and 235-b may represent intervening buildings or other objects. To fill coverage holes, base station 205 may communicate with UEs 215 via repeaters 206. For example, base station 205 may communicate with UE 215-a via repeater 206-a, and base station 205-a may communicate with UE 215-b via repeater 206-b. Alternatively, although not shown in FIG. 2, base station 205 may communicate with UE 215-b or other UEs 215 via repeater 206-a and repeater 206-c, where repeater 206-a and repeater 206-c may be configured as a chain to extend the coverage of base station 205.

In some cases, repeater 206 may be an amplify-forward repeater. An amplify-forward repeater may receive a signal from a transmitting entity (e.g., base station 205 or UE 215), amplify the signal, and alter the beam direction towards a receiving entity (e.g., base station 205 or UE 215). The process of sending the signal through the repeater 206 may introduce noise to the system. The noise may be reflected in one or more quality metrics for a communication path (e.g., SNR of a communication path). The SNR may be used to compare the level of a desired signal to the level of background noise in a system. Thus, a higher SNR may be desirable for applications requiring a stronger signal.

There may be an SNR value associated with the transmission of a signal to each device. The transmission of a signal from one device to another may be referred to as a hop. For example, a transmission from a base station 205 to UE 215-b that includes repeater 206-b has two hops. The first hop is from base station 205 to repeater 206-b. The second hop is from repeater 206-b to UE 215-b. Each hop of a communication path may have an SNR value that may affect the end-to-end SNR value by a different magnitude based on noise added to the system with each hop.

In one example, the signal may travel from a source (e.g., base station 205 or UE 215) to a destination (e.g., base station 205 or UE 215) through a repeater 206. The end-to-end SNR may be calculated based on the noise from each hop in the path. The first hop may be between the source and repeater 206. The SNR value for the first hop, or $SNR_1$, may be calculated based on the power of the transmission signal from the source and factors that affect the noise such as variations in the channel (e.g., path loss) and additive noise. The second hop may be between repeater 206 and the destination. The SNR value for the second hop, or $SNR_2$, may be calculated based on the power of the transmission signal leaving the repeater, variations in the channel, and additive noise. The values of $SNR_1$ and $SNR_2$ may not be the only factors in end-to-end SNR.

The repeater may introduce noise that may affect the end-to-end SNR and the power output of the repeater. The repeater may operate in full effect, in which case it may receive a signal and immediately alter and transmit the signal. The process may result in a feedback loop that may leak a damped output signal into one or more input ports, resulting in noise in the repeater. The repeater may also have an internal noise, which may be referred to as a noise figure, represented by F. Therefore, the input SNR to the repeater 206 may be greater than the output SNR from repeater 206. The internal noise and feedback loop of repeater 206 may reduce the power input to repeater 206, resulting in a lower power output. This decrease in power may result in lower value for $SNR_2$, referred to as $SNR'_2$.

Taking the factors mentioned above into consideration, the end-to-end SNR for a two-hop path, which includes a source, one amplify-forward repeater 206 and a destination, may be represented as $SNR_{AF}$ in terms of $SNR_1$, $SNR'_2$ and F as shown below with respect to Eq. 1.

$$SNR_{AF} = \frac{1}{\frac{F}{SNR_1} + \frac{1}{SNR'_2}\left(1 + \frac{F}{SNR_1}\right)} \quad \text{Eq. 1}$$

In Eq. 1, $SNR_1$ is reduce by a factor of F for the first term in the denominator. The term $$\frac{F}{SNR_1}$$

may be much smaller than 1. In this case, the second term in the denominator may simplify to $$\frac{1}{SNR'_2}.$$

Thus, the value of $SNR_1$ may be reduced by a factor of F while the value of $SNR'_2$ may not. This phenomenon may be referred to as the noise boosting effect. The noise boosting effect takes into consideration the case where the repeater may boost the noise from the first hop, then transmit the signal with the boosted noise in the second hop. The SNR values for the first hop and the second hop may not be symmetric. For example, if $SNR_1$ is a large value, the factor F may not reduce the term $$\frac{F}{SNR_1}$$

as much as when $SNR_1$ is small, resulting in a greater $SNR_{AF}$. As a result, it may be beneficial to determine which hop has the greater SNR value, and then choose that as the first hop when sending data.

In some examples, base station 205 may communicate with UEs 215-a and 215-b. Due to obstructions 235-a and 235-b, base station 205 may not be able to communicate directly with UEs 215-a and 215-b, respectively. Instead, base station 205 may determine to communicate via repeaters 206. Base station 205 may transmit the signal, including repeater configuration information, data, control information, or the like, to repeater 206-a using the transmission beam 225-a, and repeater 206-a may receive the signal using reception beam 230-a. In some examples, repeater 206-a may receive the signal, acquire any configuration information relevant to repeater 206-a, and forward a data transmission, control transmission or a portion of the configuration information to repeater 206-c using transmission beam 225-e. Repeater 206-c may receive the forwarded message using reception beam 230-e. In some cases, where base station 205 uses a chain of repeaters 206 including repeater 206-a and repeater 206-b to communicate with another UE 215, repeater 206-c may relay a received signal on to a subsequent repeater 206 in the chain, or directly to another UE 215 (not shown). Similarly, base station 205 may transmit a signal to repeater 206-b using transmission beam 225-b, and repeater 206-b may receive the signal using reception beam 230-b. Repeater 206-b may relay the signal to UE 215-b using transmission beam 225-d, and UE 215-b may receive the relayed signal using reception beam 230-d.

The signal from base station 205 may include configuration information for communicating with UEs 215-a and 215-b. For example, base station 205 may configure repeater 206-a for sending one type of signal to UE 215-a using the transmission beam 225-c, and UE 215-a may receive the signal using reception beam 230-c. Similarly, base station 205 may configure repeater 206-b for sending a different type of signal to UE 215-b using transmission beam 225-d, and UE 215-b may receive the signal using reception beam 230-d.

In some cases, base station 205 may configure a repeater 206 for uplink or downlink signaling. For example, base station 205 may configure repeater 206-a for downlink signaling. In such cases, repeater 206-a may receive downlink transmissions from base station 205 using reception beam 230-a, and may relay the signal to another device (e.g., repeater 206-c) using transmission beam 225-e. In some examples, base station 205 may configure repeater 206-a to provide uplink signaling. In such cases, repeater 206-a may receive uplink signals from a downstream device (e.g., repeater 206-c) using one or more reception beams 230. Repeater 206-a may relay the uplink transmissions to base station 205 using one or more transmission beams 225.

Figure 3:
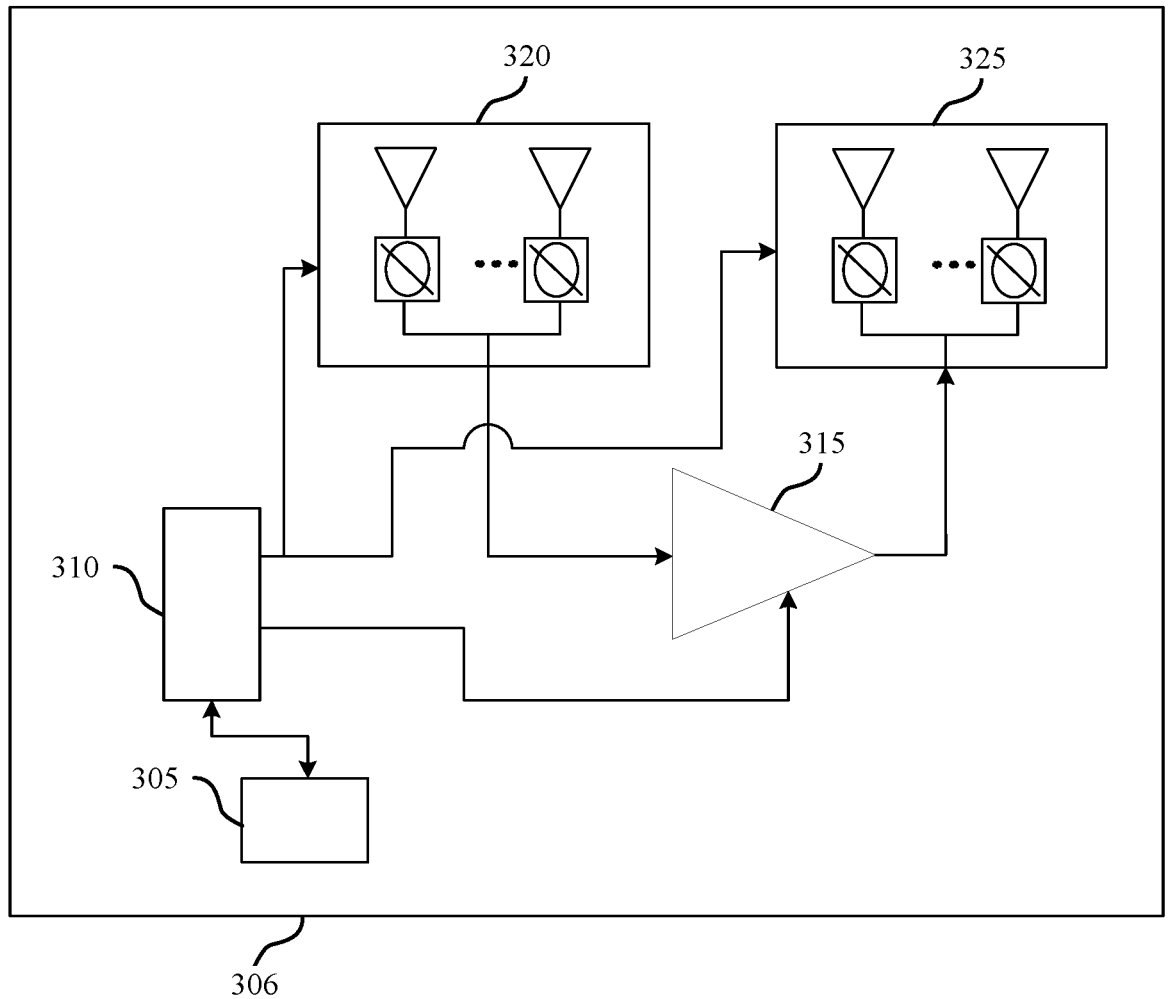
FIG. 3 illustrates an example of a baseline architecture that supports techniques for multi-TRP operation via repeaters in accordance with aspects of the present disclosure.

FIG. 3 illustrates an example of a baseline architecture 300 that supports techniques for multi-TRP operation via repeaters in accordance with aspects of the present disclosure. In some examples, baseline architecture 300 may implement aspects of wireless communications system 100.

The baseline architecture 300 for a repeater 306 (e.g., a millimeter wave repeater) may be part of a multi-TRP operation. Repeater 306 may be a layer 1 repeater. A layer 1 repeater may have limited capabilities when compared with a higher layer repeater but may reduce cost and power requirements. Repeater 306 may not perform digital processing, so the transmitting entity may perform control and scheduling operations for repeater 306 remotely. Repeater 306 may have a control interface 305. Control interface 305 may be out-of-band or in-band. An out-of-band control interface 305 may use a different RAT (e.g., NR and Bluetooth) or a different frequency resource (e.g., LTE-M, NB-IoT) than the transmitting entity. An in-band control interface 305 may use a part of the same carrier frequency, with a smaller bandwidth, as the transmit signal. The transmitting entity may send a signal to control interface 305 of repeater 306. The signal may be an analog signal. In some cases, the signal may include control information, configuration information, or both. The transmitting entity may send beamforming configurations to control interface 305 (e.g., via a separate modem or in-band control).

Control interface 305 may communicate signal information with a controller 310 via a communication link. Controller 310 may then amplify the power of the received analog signal by using a variable gain amplifier 315. In some cases, controller 310 may receive control information to direct the signal to one of phased arrays 320 or 325 instead of through variable gain amplifier 315. Phased arrays 320 and 325 may use beamforming configurations from the transmitting entity to redirect the beam. In some cases, the signal may pass through variable gain amplifier 315 before continuing to phased arrays 320 and 325. Control interface 305 may receive configuration information from the transmitting entity that allows repeater 306 to perform beamforming for both transmission and reception of signals.

Repeater 306 may be able to communicate with the transmitting entity via a backhaul link. Repeater 306 may be able to talk to the receiving entity via an access link. Controller 310 may use these links when processing information from control interface 305. Repeater 306 may have a different beam for transmission and reception.

As discussed with reference to FIG. 2, a transmitting entity (e.g., a base station) may select a communication path, which may include one or more repeaters 306, for communications of a certain type (e.g., uplink, downlink, control, data, broadcast, etc.) based on an SNR of the communication path, an SNR of one or more hops of the communication path, or some combination of these SNR values.

Figure 4:
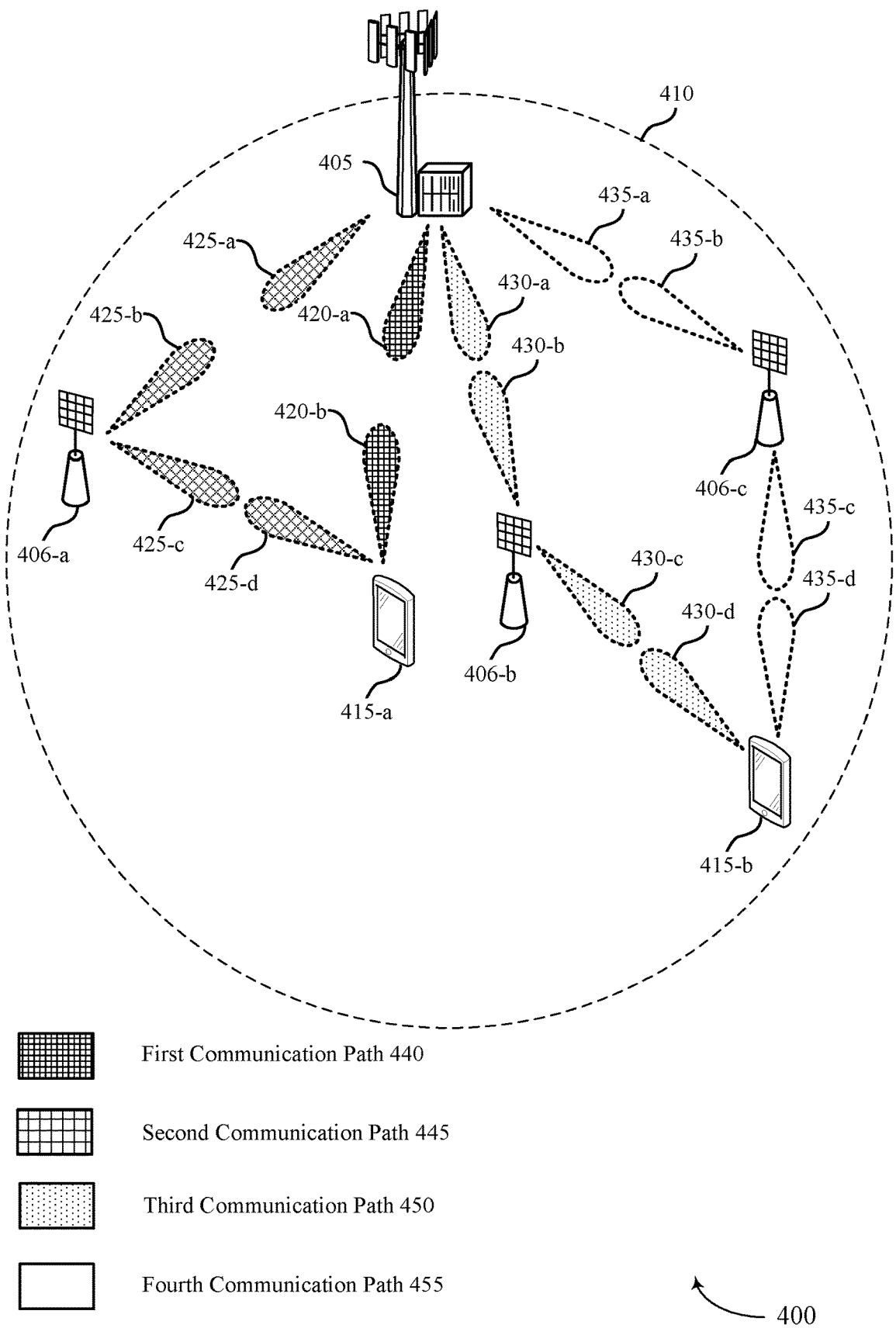
FIG. 4 illustrates an example of a wireless communications system that supports techniques for multi-TRP operation via repeaters in accordance with aspects of the present disclosure.

FIG. 4 illustrates an example of a wireless communications system 400 that supports techniques for multi-TRP operation via repeaters in accordance with aspects of the present disclosure. In some examples, wireless communications system 400 may implement aspects of wireless communications system 100.

The wireless communications system 400 may include a base station 405 and repeaters 406-a, 406-b, and 406-c with a respective geographic coverage area 410 and UEs 415-a and 415-b. While FIG. 4 depicts a single base station 405, the wireless communications system 400 may include one or more additional base stations 405, repeaters 406, and UEs 415. Base station 405 may be an example of base stations 105 described with reference to FIG. 1. Repeaters 406-a, 406-b and 406-c may be examples of repeaters 106 described with reference to FIG. 1. UEs 415-a and 415-b may be examples of UEs 115 described with reference to FIG. 1.

Base station 405 may establish one or more communication paths for communicating with one or more UEs 415. A communication path, as used herein, may refer to a directional communication path from a transmitting entity (e.g., a base station 405) to a receiving entity (e.g., UE 415-a, 415-b). Each communication path may include one repeater 406, multiple repeaters 406 or no repeater 406 between the transmitting entity and the receiving entity. Each link in the communication path may be referred to as a hop. For example, the first hop in a communication path may be from a transmitting entity to a repeater 406. The second hop in a communication path may be from a repeater 406 to another repeater 406 or to a receiving entity. Base station 405 may select a communication path for signal transmission based on the SNR of one or more of the hops, the SNR of the entire communication link (e.g., an end-to-end SNR), or a combination or ratio of these SNR values.

In some cases, a base station 405 may detect and establish a direct communication path to a UE 415. For instance, base station 405 may communicate with UE 415-a via first communication path 440. In such examples, base station 405 may send a downlink signal to UE 415-a via beam 420-a, and UE 415-a may receive the downlink signal via beam 420-b. Or, UE 115-a may send an uplink transmission via beam 420-b, and base station 405 may receive the uplink transmission via beam 420-a. Thus, beams 420 may carry a signal from a base station 405 to a UE 415, or vice-versa, along first communication path 440. The first communication path may be an example of a direct communication path.

In some cases, base station 405 may include a repeater 406 in the communication path, as illustrated with respect to second communication path 445, third communication path 450, and fourth communication path 455. The transmitting entity (e.g., base station 405 or UE 415-a) may communicate with a receiving entity using beams 425 along second communication path 445. For example, base station 405 may send a signal via beams 425-a and 425-b to repeater 406-a. Repeater 406-a may then amplify and redirect the signal to UE 415-a via beams 425-c and 425-d. In another example, UE 415-a may transmit a signal to base station 405. UE 415-a may send a signal to repeater 406-a using beams 425-d and 425-c. Repeater 406-a may then relay the signal to base station 405 using beams 425-b and 425-a.

In some cases, base station 405 may select one or more of multiple available communication paths to communicate with a single UE 415. For instance, base station 405 may select third communication path 450 or fourth communication path 455. Upon selecting communication path 450, base station 405 may communicate with UE 415-a (e.g., uplink or downlink communications) via beams 430-a, 430-b, 430-c, and 430-d. Upon selecting fourth communication path 455, base station 405 may communicate with UE 415-b (e.g., uplink or downlink communications) via beams 435-a, 435-b, 435-c, and 435-d.

Base station 405 may take advantage of the multiple available communication paths to increase communication reliability or capacity of the system. Base station 405 may send configuration information to a repeater 406 based on a desired benefit or utilization of resources. In some cases, the transmitting entity may send the same signal over multiple paths. For instance, base station 405 may send the signal to repeater 406-b and 406-c via third communication path 450 and fourth communication path 455, respectively. If there is an obstacle blocking one of beams 430-a or 430-c, or if the signal quality for third communication path 450 is poor, the signal may not reach UE 415-b via third communication path 450. However, because base station 405 sent the same signal over fourth communication path 455, UE 415-b may successfully receive the signal, despite the blockage on third communication path 450. Base station 405 may use any number of communication paths to send the same signal. Thus, sending the same signal on multiple beams may improve communication reliability via spatial diversity.

In some examples, a transmitting entity may send multiple signals over multiple paths. In such examples, base station 405 may send a first signal to UE 415-b via third communication path 450 and a second signal to UE 415-b using fourth communication path 455. Thus, UE 415-b may efficiently receive multiple signals, increasing the capacity of the wireless communications system by utilizing multiple communication paths in parallel.

In some examples, base station 405 may send a signal using one communication path, while a second communication path is in standby mode. For instance, base station 405 may send one or more signals via third communication path 450, and may hold fourth communication path 455 in reserve (e.g., in standby mode). In such examples, an obstacle may block the signal from reaching UE 415-b via third communication path 450 using repeater 406-b. If this happens, base station 405 may determine to activate repeater 406-c to use fourth communication path 455 for sending the signal to UE 415-b. Using a communication path in a standby mode may improve communication reliability with the added benefit of saving power when a repeater 406 is in standby mode.

Figure 6:
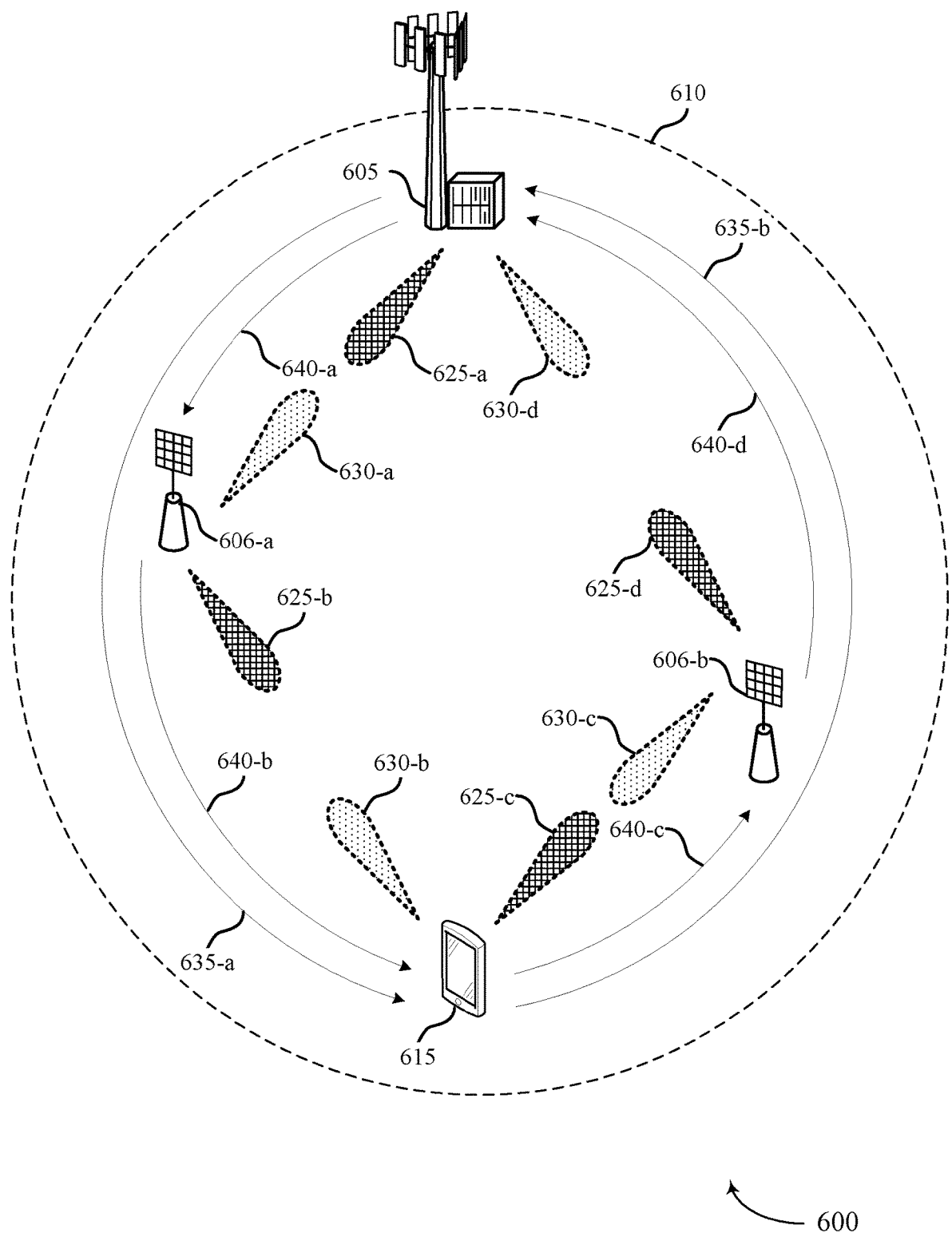
FIG. 6 illustrates an example of a wireless communications system that supports techniques for multi-TRP operation via repeaters in accordance with aspects of the present disclosure.

In yet another case, as described in greater detail with respect to FIG. 6, base station 405 may decide to use one communication path for downlink signaling and another communication path for uplink signaling. In some examples, as described in greater detail with respect to FIG. 7, base station 405 may use one communication path for one type of signal and another communication path for a second type of signal. Base station 405 may select the communication type or the uplink or downlink configuration based on an end-to-end SNR of a communication path, a hop SNR for each (e.g., one or more) hop of a communication path, a ratio of one or more hop SNRs to the end-to-end SNR of a communication path, or any combination thereof. Selecting a communication path based on such considerations may increase system capacity, improve efficiency, improve reliability, and improve user experience.

Figure 5:
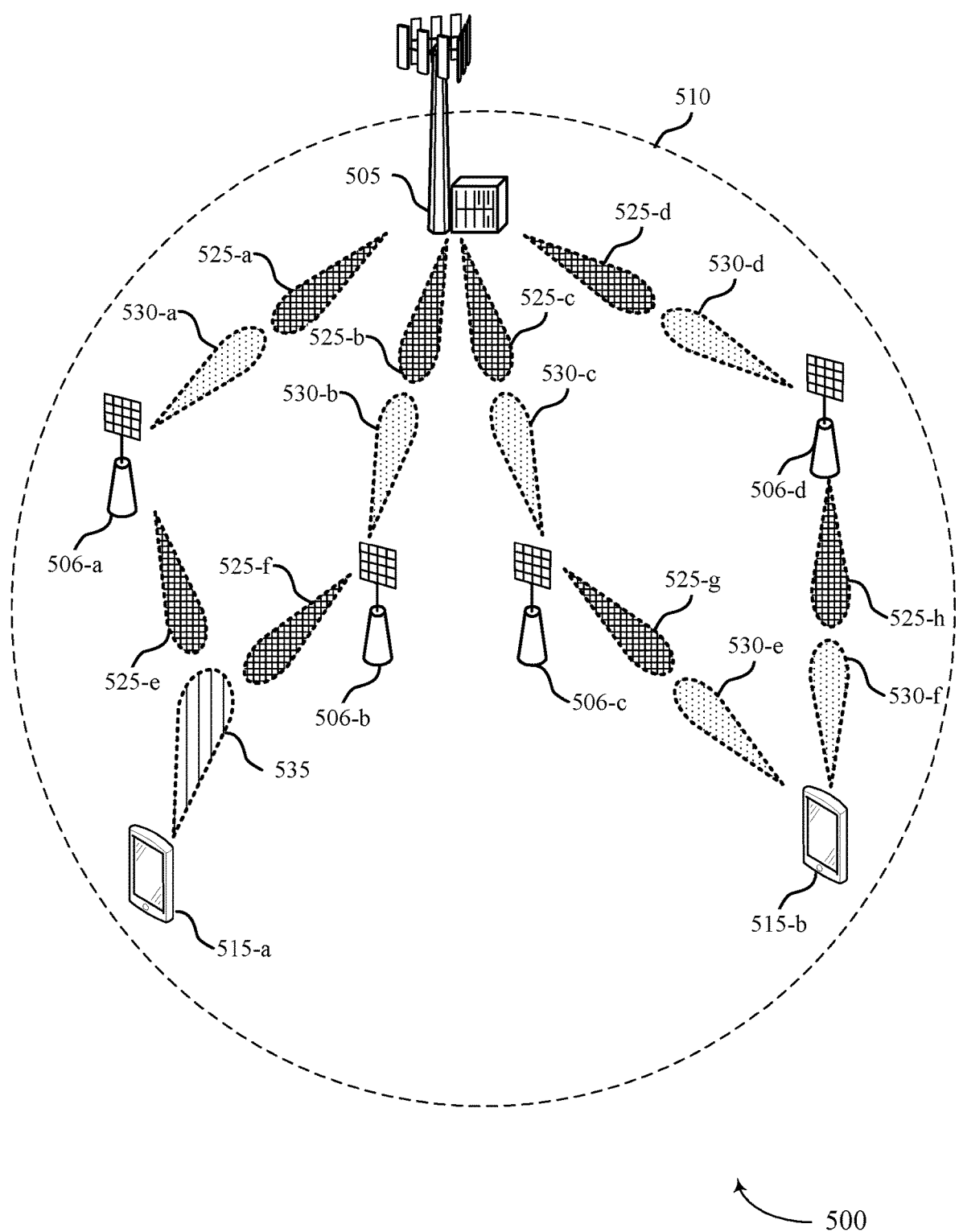
FIG. 5 illustrates an example of a wireless communications system that supports techniques for multi-TRP operation via repeaters in accordance with aspects of the present disclosure.

FIG. 5 illustrates an example of a wireless communications system 500 that supports techniques for multi-TRP operation via repeaters in accordance with aspects of the present disclosure. In some examples, wireless communications system 500 may implement aspects of wireless communications system 100. The wireless communications system 500 may include a base station 505 which may serve one or more UEs 515 within a geographic coverage area 510. The system may also include repeaters 506-a, 506-b, 506-c and 506-d and UEs 515-a and 515-b. While FIG. 5 depicts a single base station 505, the wireless communications system 500 may include one or more additional base stations 505, repeaters 506, and UEs 515, among other components. The base station 505 may be an example of base stations 105 described with reference to FIG. 1 and base stations 205 described with reference to FIG. 2. The repeaters 506-a, 506-b, 506-c and 506-d may be examples of the repeaters 106 described with reference to FIG. 1 and repeaters 206 described with reference to FIG. 2. The UEs 515-a and 515-b may be examples of the UEs 115 described with reference to FIG. 1 and UEs 215 described with reference to FIG. 2.

A UE 515 may receive signals sent over one or more communication paths using one or more reception beams 530. Although each communication path illustrated with respect to FIG. 5 depicts one repeater 506, a communication path may include one, multiple, or no repeaters 506. A base station 105 may communicate with one or more UEs 515 using the one or more communication paths, as described in greater detail with reference to FIGS. 2-4.

A UE 515 may receive signals from base station 505 using a single reception beam 535 for each respective communication path. For example, base station 505 may send a signal on a first communication path using repeater 506-a. In such examples, base station 505 may send a downlink message (e.g., data, control signaling, configuration information, etc.) on transmission beam 525-a. Repeater 506-a may receive the downlink message using reception beam 530-a and may relay the message to UE 515-a using transmission beam 525-e. Similarly, base station 505 may send another signal on a second communication path using repeater 506-b. In such cases, base station 505 may send a downlink message (e.g., data, control signaling, configuration information, etc.) on transmission beam 525-b. Repeater 506-b may receive the downlink message using reception beam 530-b and may relay the message to UE 515-a using transmission beam 525-f. The UE 515-a may receive the message from either communication path with the same reception beam 535. In some examples, reception beam 535 may be sufficiently course (e.g., spatially broad) to receive downlink or relayed messages from a variety of spatial directions. Thus, reception beam 535 may receive signals from both communication paths. Reception beam 535 may be referred to as a composite beam. In some cases, UE 515-a may receive the different messages from each communication path without determining any difference between communication paths. That is, UE 515-a may be unaware of multiple communication paths, and may receive messages from multiple devices (e.g., repeater 506-a, repeater 506-b, etc.) regardless of the source of the signal. Similarly, UE 515-a may send uplink messages via a course transmission beam such that multiple devices (e.g., repeater 506-a, repeater 506-b, etc.) may receive the uplink transmission and relay it to base station 505.

A UE 515 may receive signals from base station 505 using a different reception beam 530 for each respective communication path. For example, base station 505 may send a signal on a first communication path using repeater 506-c. For instance, base station 505 may send a downlink message (e.g., data, control signaling, configuration information, etc.) on transmission beam 525-c. Repeater 506-c may receive the downlink message using reception beam 530-c and may relay the message to UE 515-b using transmission beam 525-g. Similarly, base station 505 may send another signal on a second communication path using repeater 506-d. In such examples, base station 505 may send a downlink message (e.g., data, control signaling, configuration information, etc.) on transmission beam 525-d. Repeater 506-d may receive the downlink message using reception beam 530-d and may relay the message to UE 515-b using transmission beam 525-h. UE 515-b may receive a downlink message via the first communication path using reception beam 530-e and may receive another downlink message via the second communication path using reception beam 530-f. Similarly, in some examples, UE 515-a may send an uplink message via a first communication path using repeater 506-c using a first transmission beam and may send another uplink message via a second communication path using repeater 506-d using a second transmission beam.

FIG. 6 illustrates an example of a wireless communications system 600 that supports techniques for multi-TRP operation via repeaters in accordance with aspects of the present disclosure. In some examples, wireless communications system 600 may implement aspects of wireless communications system 100. The wireless communications system 600 may include a base station 605 with a respective geographic coverage area 610. The system may also include repeaters 606-a and 606-b, and UE 615. While FIG. 6 depicts a single base station 605, the wireless communications system 600 may include one or more additional base stations 605, repeaters 606, and UEs 615, among other components. The base station 605, repeaters 606, and UE 615 may be examples of the corresponding devices described with reference to FIGS. 1-5.

In some cases, base station 605 may select one or more communication paths 635 for uplink and downlink communication based on one or more SNR values of the communication paths 635. A repeater 606 of a communication path 635 may amplify noise in the process of amplifying a signal. As a result, one or more determined SNR values and ratios of a communication path 635 may be used for determining signal quality of the communication path 635. Communication path 635-a may have a different end-to-end SNR than communication path 635-b. Communication path 635-a may have a first hop 640-a and a second hop 640-b. Communication path 635-b may have a first hop 640-c and a second hop 640-d. The difference in end-to-end SNR for communication paths 635-a and 635-b may directly relate to the SNR for a first hop 640-a, the SNR for a second hop 640-b, and first hop 640-c and second hop 640-d. In some examples, due to the amplified noise of each repeater 606 of a communication path, the SNR of first hop 640-a and first hop 640-c of first communication path 635-a and communication path 635-b, respectively, may have a greater impact on the respective communication paths 635 than second hop 640-b and second hop 640-d. Base station 605 may use this information to configure repeaters 606 to select a communication path 635 with stronger SNR for the first hop 640. Base station 605 may use a first communication path 635-a for one type of communication and a second communication path 635-*b* for a second type of communication based on the end-to-end SRN and first hop SNR values for each communication path 635.

Base station 605 may select a communication path 635 for uplink communications, and another communication path 635 for downlink communications, based on the SNR values and SNR ratios. For instance, base station 605 may select communication path 635-*a* for downlink communication and may select communication path 635-*b* for uplink communication, and the selection may be based on the first hop SNR for each communication path 635. In a first hop 640-*a* on communication path 635-*a*, base station 605 may send a downlink signal on transmission beam 625-*a*, and repeater 606-*a* may receive the downlink signal using reception beam 630-*a*. Repeater 606-*a* may then amplify and redirect the signal on transmission beam 625-*b* in a second hop 640-*b* according to configuration information from the base station 605. UE 615 may then receive the signal on reception beam 630-*b*. Base station 605 may select communication path 635-*b* for uplink communication. In a first hop 640-*c* on second communication path 635-*b*, UE 615 may send an uplink signal on transmission beam 625-*c*, and repeater 606-*b* may receive the uplink signal using reception beam 630-*c*. Repeater 606-*b* may then amplify and redirect the uplink signal on transmission beam 625-*d* in a second hop 640-*d* according to configuration information from base station 605. Base station 605 may then receive the uplink signal on reception beam 630-*d*.

In some cases, base station 605 may take first hop SNR into account when determining which communication path 645 to use for uplink and downlink signaling. Many factors may affect first hop SNR, including proximity. For example, base station 605 may select communication path 635-*a* for downlink signaling to UE 615. The first hop 640-*a* for communication path 635-*a* may have a higher SNR than the second hop 640-*b* (e.g., because repeater 606-*b* may be closer to base station 605 than to UE 615). Similarly, base station 605 may select communication path 635-*b* for uplink from UE 615. The first hop 640-*c* for communication path 635-*b* may have a higher SNR than the second hop 640-*d* (e.g., because repeater 606-*b* may be closer to UE 615 than to base station 605). Base station 605 may send configuration information to each repeater 606-*a* and 606-*b* upon selecting communication paths 635 based on first hop SNR. The configuration information may indicate the selection to the repeaters 606, and may configure them for downlink communication, and uplink communication, respectively.

In some cases, base station 605 may determine a multi-TRP operation to avoid maximum permissible exposure (MPE) limitations. For example, base station 605 may not be able to use a direct communication path for downlink with UE 615 because a device or user is too close to UE 615. Communicating directly with UE 615 may surpass MPE restrictions. Instead, base station 605 may determine downlink communication path 635-*a* limits exposure by using an indirect repeater 606-*a* and may therefore be allowable under MPE restrictions.

Figure 7:
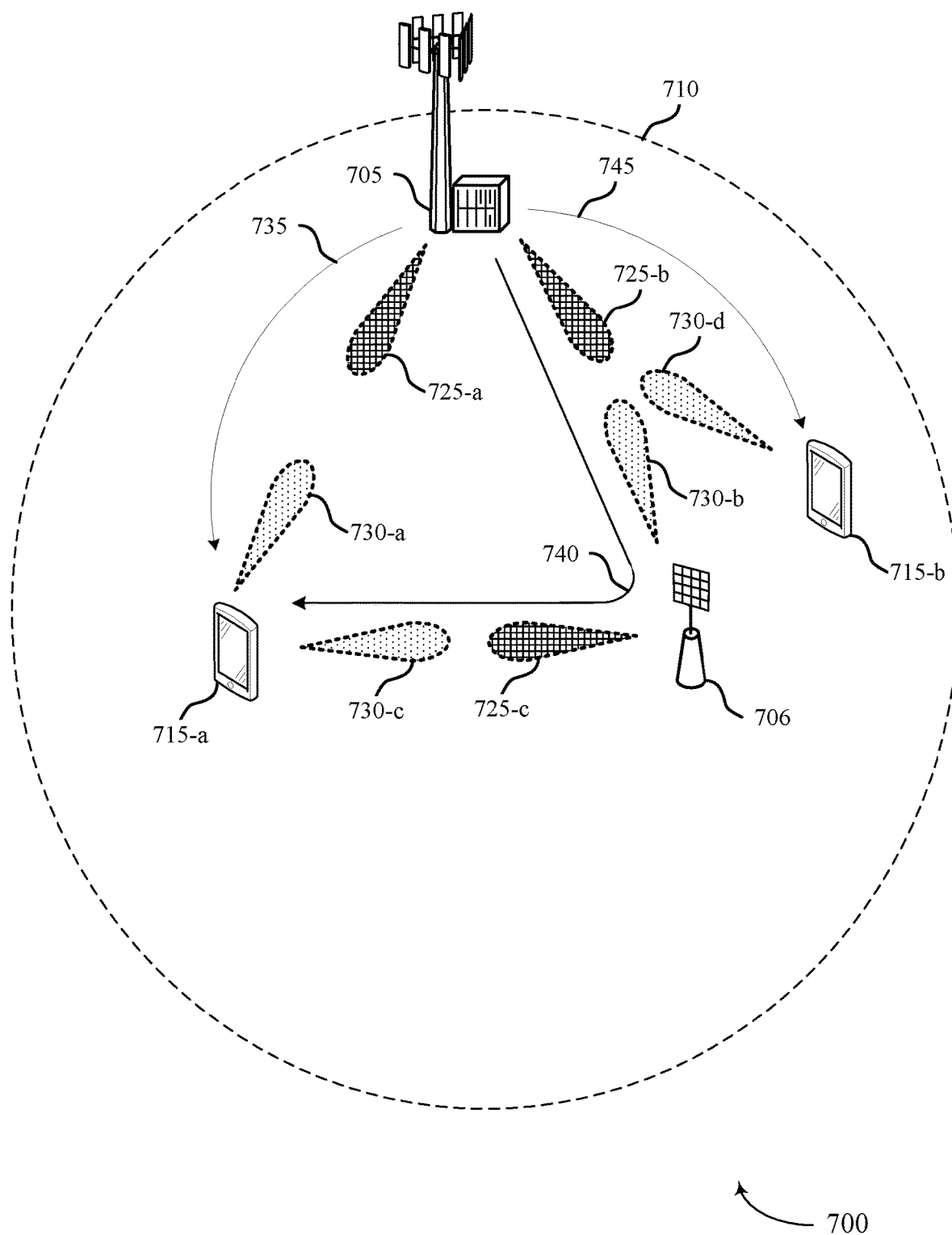
FIG. 7 illustrates an example of a wireless communications system that supports techniques for multi-TRP operation via repeaters in accordance with aspects of the present disclosure.

FIG. 7 illustrates an example of a wireless communications system 700 that supports techniques for multi-TRP operation via repeaters in accordance with aspects of the present disclosure. In some examples, wireless communications system 700 may implement aspects of wireless communications system 100. The wireless communications system 700 may include a base station 705 with a respective geographic coverage area 710. The system may also include repeater 706 and UEs 715-*a* and 715-*b*. While FIG. 7 depicts a single base station 705, the wireless communications system 700 may include one or more additional base stations 705, repeaters 706, and UEs 715, among other components. The base station 705, repeater 706, and UEs 715 may be examples of corresponding devices described with reference to FIG. 1.

Base station 705 may identify multiple communication paths 735, 740, and 745 with one or more UEs 715. In some cases, base station 705 may select a communication path 735, 740, or 745 based on type of signal (e.g., data, broadcast signaling, control signaling, etc.). Base station 705 may establish a direct communication path 735 with UE 715-*a*. When using communication path 735, base station 705 may send a signal using transmission beam 725-*a*. UE 715-*a* may receive the signal with reception beam 730-*a*. In a second communication path 740, base station 705 may communicate with UE 715-*a* via a repeater 706. Base station 705 may transmit a signal on transmission beam 725-*b*. Repeater 706 may receive the signal with reception beam 730-*b*. Repeater 706 may amplify and redirect the signal to UE 715-*a* with transmission beam 725-*c*. UE 715-*a* may receive the signal with reception beam 730-*c*. In a third communication path 745, base station 705 may be able to send signals (e.g., control information) to multiple UEs 715-*a* and 715-*b*. Base station 705 may transmit the signals on the same transmission beam 725-*b*. For instance, base station 705 may multiplex (e.g., OFDM) the signals and send them simultaneously or at different times (e.g., via TDM) via transmission beam 725-*b*. UE 715-*b* and repeater 706 may be able to receive independent signals that the base station combined into a same OFDM symbol. UE 715-*b* may receive one or more of the signals via reception beam 730-*d*. Repeater 706 may receive the signal via reception beam 730-*b*, and may relay the signal to UE 715-*a* via transmission beam 725-*c*.

In one example, base station 705 may select different communication paths for different types of communication. For instance, base station 705 may determine that communication path 735 may be a strong communication path directly to UE 715-*a*. Base station 705 may also determine that communication path 740, using repeater 706, may be weaker than communication path 735 (i.e., the SNR values for communication path 735 may be greater than communication path 740). In some examples, different types of communication may depend on greater SNR, more available frequency resources, or both (e.g., data communications). Thus, base station 705 may determine that such types of communication should be sent via a communication path with a stronger link (e.g., higher SNR or more available frequency resources). In such examples, base station 705 may use communication path 735 having a stronger link to send a data signal. Base station 705 may use communication path 740, with a weaker link than the first communication path 735, to send a broadcast or control signal (which may not depend on such high SNR or may not use as many frequency resources).

In some examples, base station 705 may communicate with multiple UEs via different communication paths via a single transmission beam 725. For instance, base station 705 may use communication path 745 to send a signal (e.g., control information) to UE 715-*b* using the same transmission beam 725-*b* as for communication path 740. That is, base station 705 may determine which communication paths have a weak link or strong link with a UE 715 to enable more efficient resource utilization. For instance, base station 705 may determine to send one or more signals to multiple UEs 715 (e.g., control information for both UE 715-*a* and UE 715-*b*). Base station 705 may transmit the control information using transmission beam 725-*b*. UE 715-*b* may receive the control information via communication path 745, and UE 715-*a* may receive the control information via communication path 740.

Figure 8:
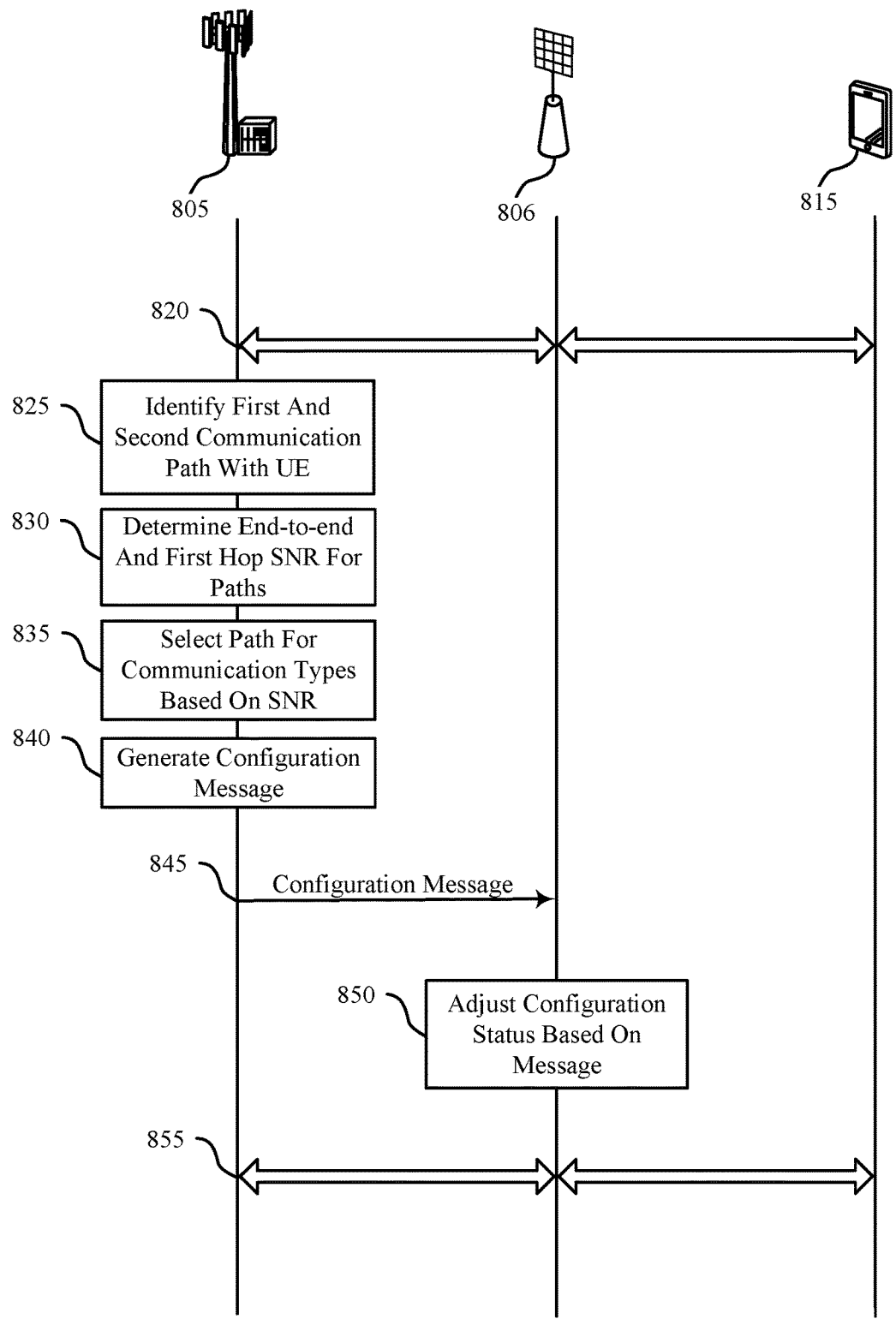
FIG. 8 illustrates an example of a process flow that supports techniques for multi-TRP operation via repeaters in accordance with aspects of the present disclosure.

FIG. 8 illustrates an example of a process flow 800 that supports techniques for multi-TRP operation via repeaters in accordance with aspects of the present disclosure. In some examples, process flow 800 may implement aspects of wireless communications system 100. The process flow 800 may be an example of a multi-TRP operation between a base station 805, repeater 806 and receiving entity (e.g., a 815) in conjunction with directional communication links 820.

Base station 805 may identify a number of communication paths for communicating with a UE 815. In one illustrative example, a communication path may include repeater 806. In other examples, there may be multiple repeaters 806 in a single communication path. In some examples, base station 805 may communicate directly with the UE 815 on one communication path and through a repeater 806 to the UE 815 on a different communication path. The process flow 800 may illustrate any combination of these examples. As described with respect to FIG. 8, base station 805 may send downlink communications to UE 815, or UE 815 may send uplink communications to base station 805, or both.

At 820, base station 805 and repeater 806 may communicate via a directional communication link (e.g., via one or more directional beams). Repeater 806 and UE 815 may communicate via another directional communication link (e.g., via one or more directional beams). In some examples, base station 805 may communicate directly with one or more UEs 815, without communicating with repeater 806. In some examples, base station 805 may select a first type of communication for a first communication path, and a second type of communication for a second communication path (as described in greater detail with respect to FIG. 6). In some examples, base station 805 may communicate certain types of signals through a repeater 806 (e.g., signals with low SNR requirements) and other types of signals through a direct link (e.g., signals with high SNR requirements) even if the direct communication signal is available for transmission.

At 825, base station 805 may identify a first and second communication path with UE 815. Each communication path may have one repeater 806, multiple repeaters 806, or no repeaters 806. At least one communication path (e.g., the first communication path or the second communication path) may include at least one repeater 806. For instance, in reference to process flow 800, where there are two communication paths, if the first communication path does not include a repeater 806, the second may include a repeater 806, and vice-versa.

At 830, base station 805 may determine end-to-end SNR values for the first and second communication paths. Base station 805 may also determine SNRs for the first hop in the first commination path and the first hop in the second communication path. The end-to-end SNR may correlate with the first hop SNR.

At 835, base station 805 may select a first communication path for a first communication type and a second communication path for a second communication type. The selection of the first and second communication paths may be based on the SNR values for the first hop determined at 830, SNR values for a second hop determined at 830, an end-to-end SNR determined at 830, a ratio of one or more of the hop SNRs to the end-to-end SNR determined at 830, or any combination thereof. In some cases, base station 805 may determine the communication paths based on the magnitude of the SNR for the first hop. For example, base station 805 may select a first communication path for uplink communications and a second communication path for downlink communications. The downlink communication path may have a higher SNR value for the first hop between base station 805 and repeater 806. The uplink communication path may have a higher SNR value for the first hop between UE 815 and repeater 806. Base station 805 may determine the downlink and uplink communication paths before sending or receiving a signal.

In some cases, base station 805 may configure the first communication path for a first type of downlink signal and a second communication path for another type of downlink signal. Base station 805 may select the first communication path based on determining that the first end-to-end SNR or the first ratio is higher than the second end-to-end SNR or the second ratio. In some examples, base station 805 may determine to send a data signal in a downlink signal on the communication path with the higher end-to-end or first hop SNR. In such cases, after selecting the paths, base station 805 may transmit the first type of downlink signal on the first communication path and the second type of downlink signal on the second communication path. The first type of communication signal may be a data signal and the second may be a broadcast or control signal. In some cases, the first communication path may be a direct link between base station 805 and UE 815, and the second communication path may utilize one or more repeaters.

In some cases, base station 805 may select the first communication path for a first set of signals. The first communication type may include a first communication stream (e.g., includes a first set of one or more signals). The base station 805 may select the second communication path for a second set of signals. The second communication type may include a second communication stream (e.g., includes a second set of one or more signals different from the first set of signals).

In another example, base station 805 may select a first communication path with UE 815 that includes a repeater 806. Repeater 806 may be in an active communication mode. Base station 805 may reserve a second communication path with a second repeater 806 for backup communications. The second repeater 806 may be in a backup communication mode, unless the first communication path fails. For example, if an obstacle blocks the first communication path, base station 805 may decide to activate the second repeater 806 and open a second communication path on which to send signals until the first communication path is clear.

At 840, after selecting the commination paths, base station 805 may generate a configuration message for repeater 806. The configuration message may include information regarding which communication path corresponds with which communication type. The communication paths may be determined based on SNR ratios for the first hop SNR and end-to-end SNRs of each path.

At 845, base station 805 may send the configuration message to repeater 806. Repeater 806 may receive configuration message 845 (e.g., in the first communication path). The configuration message may indicate to repeater 806 how to adjust its configuration. Based on the configuration information, repeater 806 may monitor for, receive, amplify, and redirect one or more signal to the desired destination device (e.g., at 860). In some examples, the configuration information may apply to multiple repeaters 806 of a chain of repeaters 806. In such examples, one or more repeaters 806 of the chain of repeaters 806 may receive the configuration message and relay the configuration message to subsequent repeaters 806.

At 850, repeater 806 may adjust its configuration based on the configuration message received at 845 from base station 805 for subsequent communications at 860.

At 860, base station 805 may communicate with UE 815 via repeater 806. For instance, a communication type may be an uplink signal, in which case repeater 806 may relay communication from UE 815 to base station 805 based on the configuration message received at 845. The communication type may be a downlink signal, in which case repeater 806 may relay the message from base station 805 to UE 815. The configuration message may indicate that repeater 806 is to relay a downlink message of a type (e.g., a broadcast signal, a control signal, or a data signal). Based on the configuration information, repeater 806 may relay a first copy of a signal or a first set of signals between UE 815 and base station 805. In some example, the repeater 806 may relay information between base station 805 and UE 815 in an active communication mode. If base station 805 unsuccessfully transmits signals on a different communication path, a repeater 806 that was in backup communication mode may be activated (e.g., via configuration message 845) relay information between UE 815 and base station 805.

Figure 9:
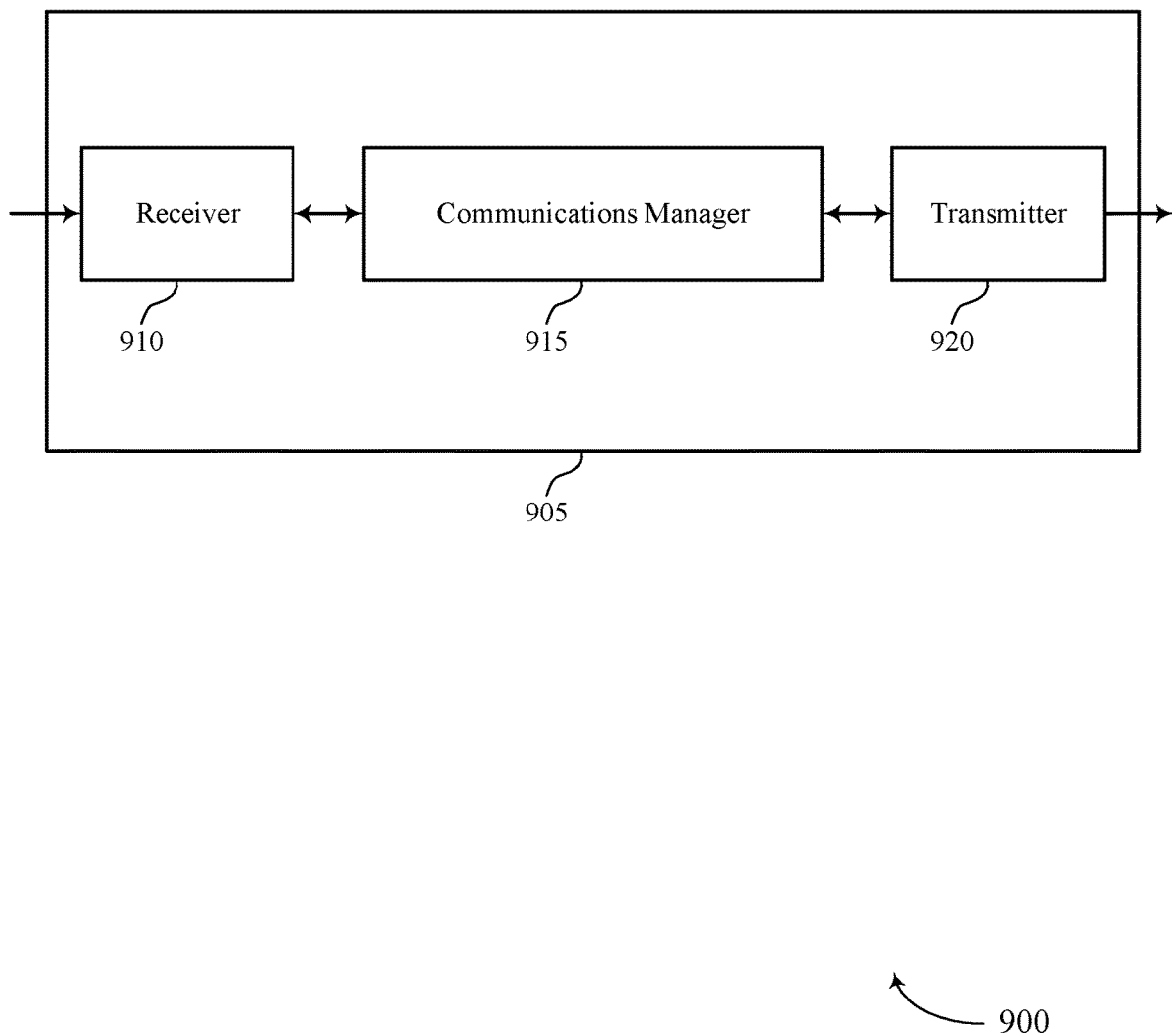
FIGS. 9 and 10 show block diagrams of devices that support techniques for multi-TRP operation via repeaters in accordance with aspects of the present disclosure.

FIG. 9 shows a block diagram 900 of a device 905 that supports techniques for multi-TRP operation via repeaters in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques for multi-TRP operation via repeaters, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a first communication path with a UE and a second communication path with the UE, where the first communication path, the second communication path, or both includes one or more repeaters, determine a first end-to-end quality for the first communication path and a second end-to-end quality for the second communication path, where the first end-to-end quality and the second end-to-end quality each include at least a first hop quality associated with a first hop of the first communication path and the second communication path, select the first communication path for a first communication type for communications with the UE based on the first hop quality of the first end-to-end quality, the first end-to-end quality, a first ratio of the first hop quality for the first end-to-end quality and the first end-to-end quality, or a combination thereof, select the second communication path for a second communication type for communications with the UE based on the first hop quality of the second end-to-end quality, a second end-to-end quality, a second ratio of the first hop quality for the second end-to-end quality and the second end-to-end quality, or a combination thereof, and communicate with the UE, based on the selecting, via the first communication path, the second communication path, or both. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
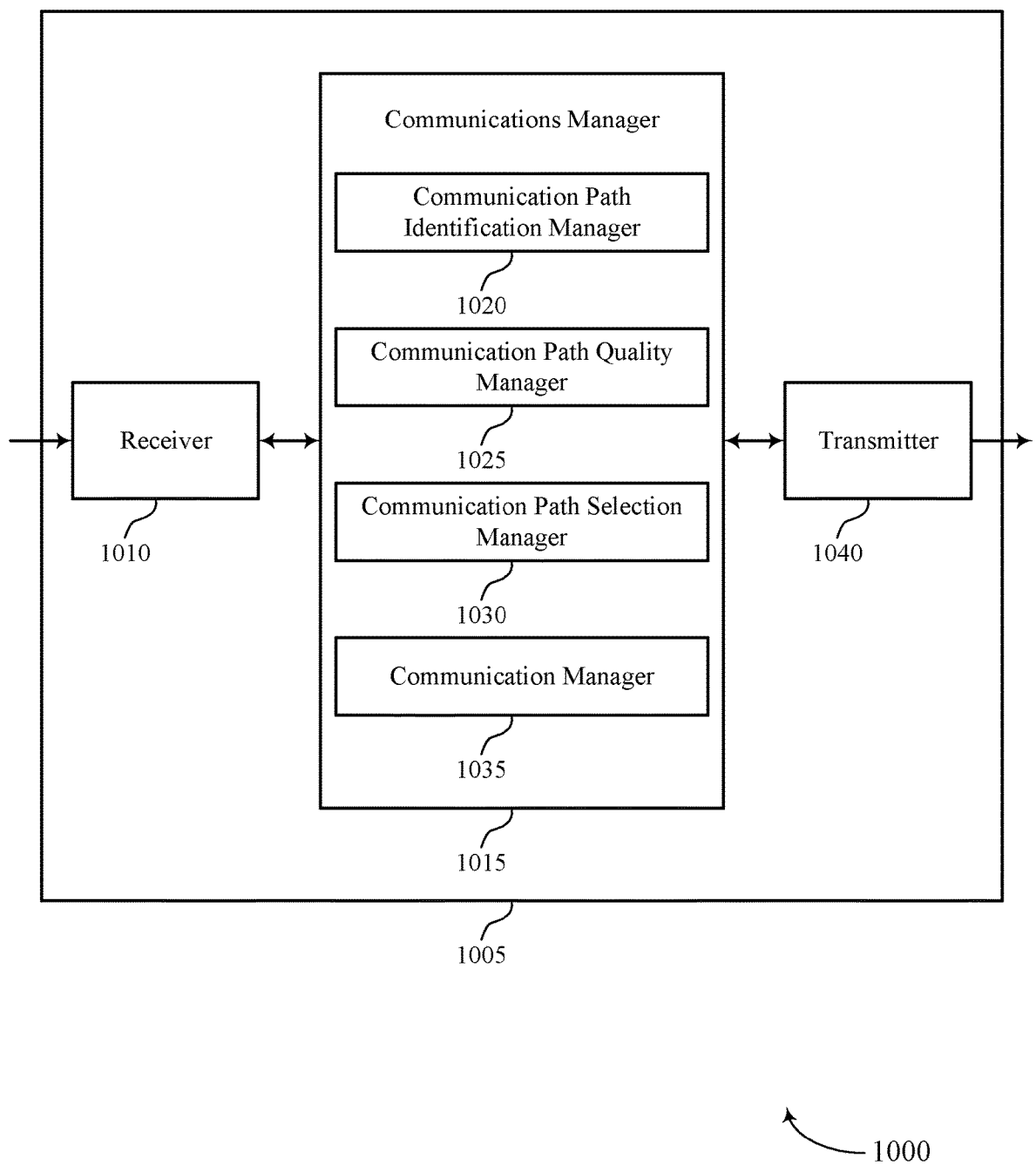

FIG. 10 shows a block diagram 1000 of a device 1005 that supports techniques for multi-TRP operation via repeaters in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for multi-TRP operation via repeaters, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a communication path identification manager 1020, a communication path quality manager 1025, a communication path selection manager 1030, and a communication manager 1035. The communications manager 1015 may be an example of aspects of the communications manager 1210 described herein.

The communication path identification manager 1020 may identify a first communication path with a UE and a second communication path with the UE, where the first communication path, the second communication path, or both includes one or more repeaters.

The communication path quality manager 1025 may determine a first end-to-end quality for the first communication path and a second end-to-end quality for the second communication path, where the first end-to-end quality and the second end-to-end quality each include at least a first hop quality associated with a first hop of the first communication path and the second communication path.

The communication path selection manager 1030 may select the first communication path for a first communication type for communications with the UE based on the first hop quality of the first end-to-end quality, the first end-to-end quality, a first ratio of the first hop quality for the first end-to-end quality and the first end-to-end quality, or a combination thereof and select the second communication path for a second communication type for communications with the UE based on the first hop quality of the second end-to-end quality, a second end-to-end quality, a second ratio of the first hop quality for the second end-to-end quality and the second end-to-end quality, or a combination thereof.

The communication manager 1035 may communicate with the UE, based on the selecting, via the first communication path, the second communication path, or both.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
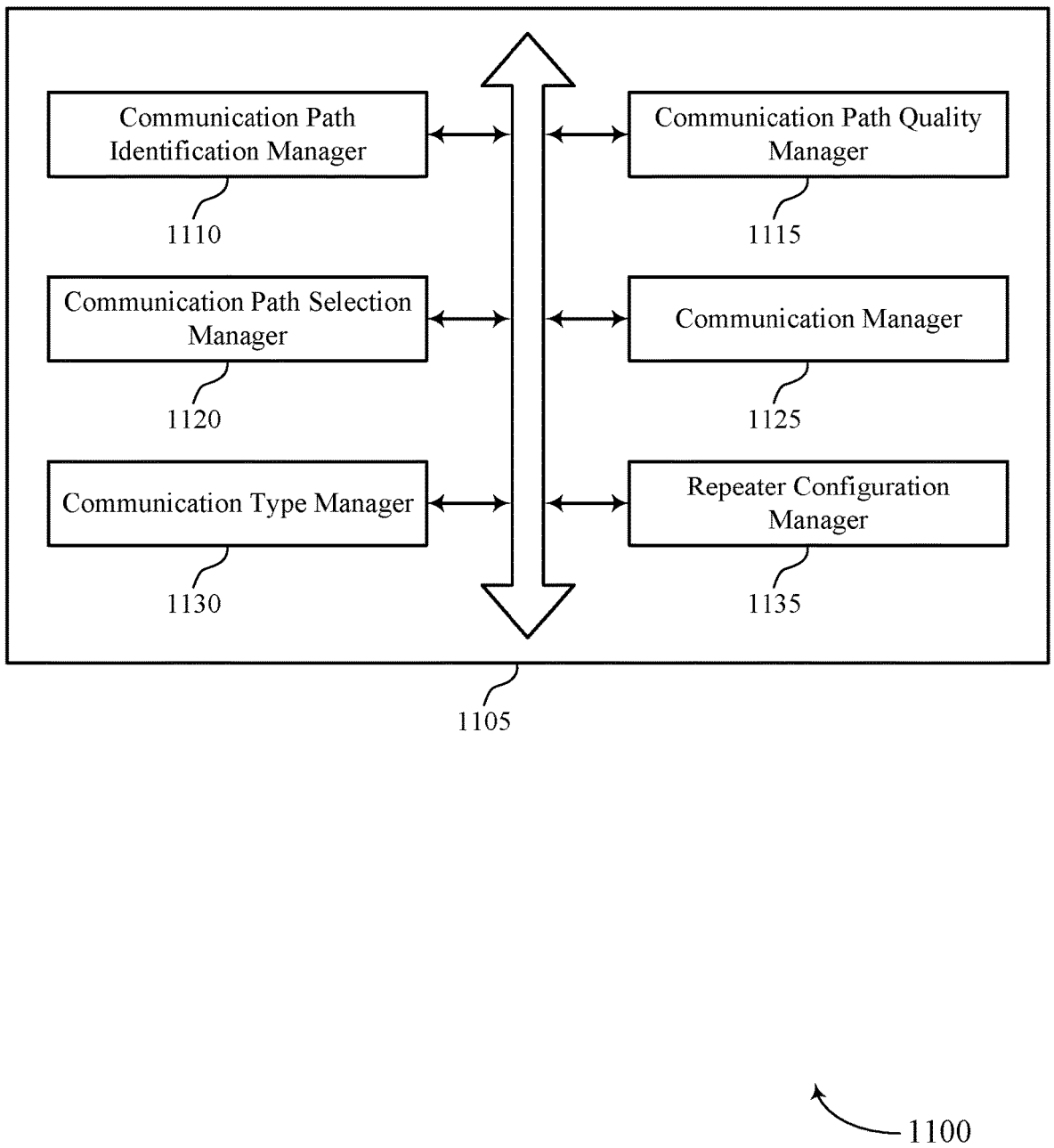
FIG. 11 shows a block diagram of a communications manager that supports techniques for multi-TRP operation via repeaters in accordance with aspects of the present disclosure.

FIG. 11 shows a block diagram 1100 of a communications manager 1105 that supports techniques for multi-TRP operation via repeaters in accordance with aspects of the present disclosure. The communications manager 1105 may be an example of aspects of a communications manager 915, a communications manager 1015, or a communications manager 1210 described herein. The communications manager 1105 may include a communication path identification manager 1110, a communication path quality manager 1115, a communication path selection manager 1120, a communication manager 1125, a communication type manager 1130, and a repeater configuration manager 1135. Each of these modules may communicate, directly or indirectly, with one another (e.g., via one or more buses).

The communication path identification manager 1110 may identify a first communication path with a UE and a second communication path with the UE, where the first communication path, the second communication path, or both includes one or more repeaters. In some cases, the second communication path includes the one or more repeaters, and where the first communication path includes a direct link between the base station and the UE.

The communication path quality manager 1115 may determine a first end-to-end quality for the first communication path and a second end-to-end quality for the second communication path, where the first end-to-end quality and the second end-to-end quality each include at least a first hop quality associated with a first hop of the first communication path and the second communication path. In some examples, the communication path quality manager 1115 may determine that the first end-to-end quality, the first ratio, or a combination thereof, is higher than the second end-to-end quality, the second ratio, or a combination thereof, where selecting the first communication path for the first type of downlink signal and selecting the second communication path for the second type of downlink signal is based on the determining. In some examples, determining the first end-to-end quality for the first communication path includes determining a first SNR for the first communication path, where determining the second end-to-end quality for the second communication path includes determining a second SNR for the second communication path, and where the first hop quality includes a first hop SNR.

The communication path selection manager 1120 may select the first communication path for a first communication type for communications with the UE based on the first hop quality of the first end-to-end quality, the first end-to-end quality, a first ratio of the first hop quality for the first end-to-end quality and the first end-to-end quality, or a combination thereof. In some examples, the communication path selection manager 1120 may select the second communication path for a second communication type for communications with the UE based on the first hop quality of the second end-to-end quality, a second end-to-end quality, a second ratio of the first hop quality for the second end-to-end quality and the second end-to-end quality, or a combination thereof.

The communication manager 1125 may communicate with the UE, based on the selecting, via the first communication path, the second communication path, or both. In some examples, the communication manager 1125 may transmit, via the first communication path, the first type of downlink signal. In some examples, the communication manager 1125 may transmit, via the second communication path, the second type of downlink signal.

The communication type manager 1130 may select the first communication path for uplink communications, where the first communication type includes uplink communications. In some examples, selecting the second communication path for downlink communications, where the second communication type includes downlink communications. In some examples, selecting the first communication path for a first type of downlink signal, where the first communication type includes the first type of downlink signal. In some examples, selecting the second communication path for a second type of downlink signal, where the second communication type includes the second type of downlink signal. In some examples, selecting the first communication path for a first signal, where the first communication type includes a first copy of the first signal. In some examples, selecting the second communication path for the first signal, where the second communication type includes a second copy of the first signal. In some examples, selecting the first communication path for a first set of signals, where the first communication type includes a first communication stream. In some examples, selecting the first communication path for a second set of signals that are different from the first set of signals, where the second communication type includes a second communication stream. In some examples, selecting the first communication path for communicating with the UE, where the first communication type includes an active communication mode. In some examples, selecting the second communication path for backup communications when communications via the first communication paths fail, where the second communication type includes a backup communication mode. In some cases, the first type of downlink signal includes data signaling. In some cases, the second type of downlink signal includes broadcast signaling or control signaling.

The repeater configuration manager 1135 may configure, based on selecting the first communication path for uplink communications, the one or more repeaters of the first communication path to receive one or more uplink signals from the UE and convey the one or more uplink signals to the base station. In some examples, the repeater configuration manager 1135 may configure, based on selecting the second communication path for downlink communications, the one or more repeaters of the second communication path to receive one or more downlink signals from the base station and convey the one or more downlink signals to the UE.

Figure 12:
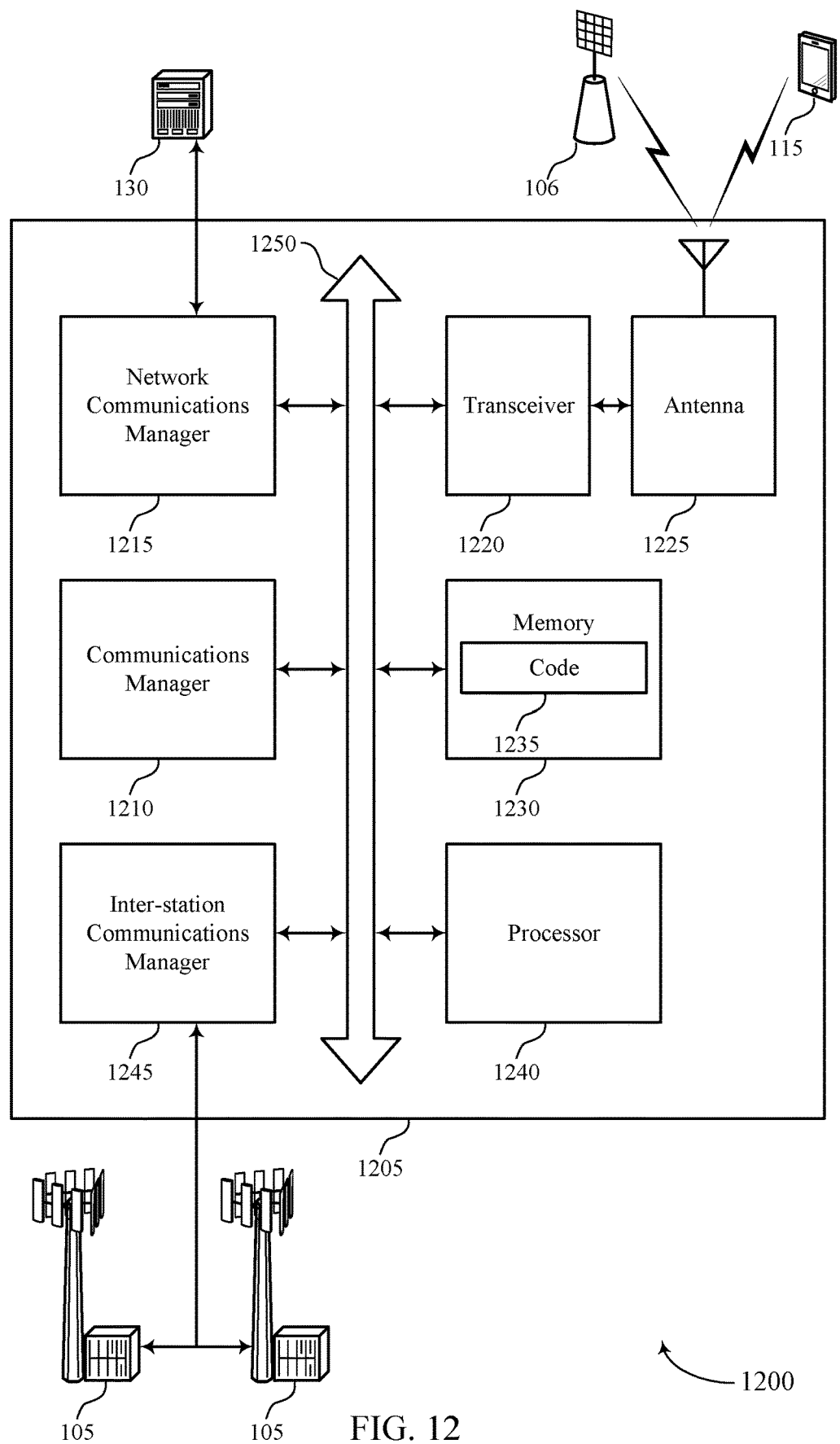
FIG. 12 shows a diagram of a system including a device that supports techniques for multi-TRP operation via repeaters in accordance with aspects of the present disclosure.

FIG. 12 shows a diagram of a system 1200 including a device 1205 that supports techniques for multi-TRP operation via repeaters in accordance with aspects of the present disclosure. The device 1205 may be an example of or include the components of device 905, device 1005, a repeater 106, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a first communication path with a UE and a second communication path with the UE, where the first communication path, the second communication path, or both includes one or more repeaters, determine a first end-to-end quality for the first communication path and a second end-to-end quality for the second communication path, where the first end-to-end quality and the second end-to-end quality each include at least a first hop quality associated with a first hop of the first communication path and the second communication path, select the first communication path for a first communication type for communications with the UE based on the first hop quality of the first end-to-end quality, the first end-to-end quality, a first ratio of the first hop quality for the first end-to-end quality and the first end-to-end quality, or a combination thereof, select the second communication path for a second communication type for communications with the UE based on the first hop quality of the second end-to-end quality, a second end-to-end quality, a second ratio of the first hop quality for the second end-to-end quality and the second end-to-end quality, or a combination thereof, and communicate with the UE, based on the selecting, via the first communication path, the second communication path, or both.

The network communications manager 1215 may manage communications with the core network (e.g., via one or more wired backhaul links). For example, the network communications manager 1215 may manage the transfer of data communications for client devices, such as one or more UEs 115, repeaters 106, or the like. The communications manager 1215 as described herein may be implemented to realize one or more potential advantages. One implementation may allow the device 1205 to increase device efficiency, decrease the likelihood of failed transmissions and latency, and improve overall system efficiency. For example, the device 1205 may reduce signaling overhead in communications with a repeater 106, as the device 1205 may be able to transmit a single multicast control message rather than transmitting multiple individual control messages for repeaters 106.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access (RAM), read-only (ROM), or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting techniques for multi-TRP operation via repeaters).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
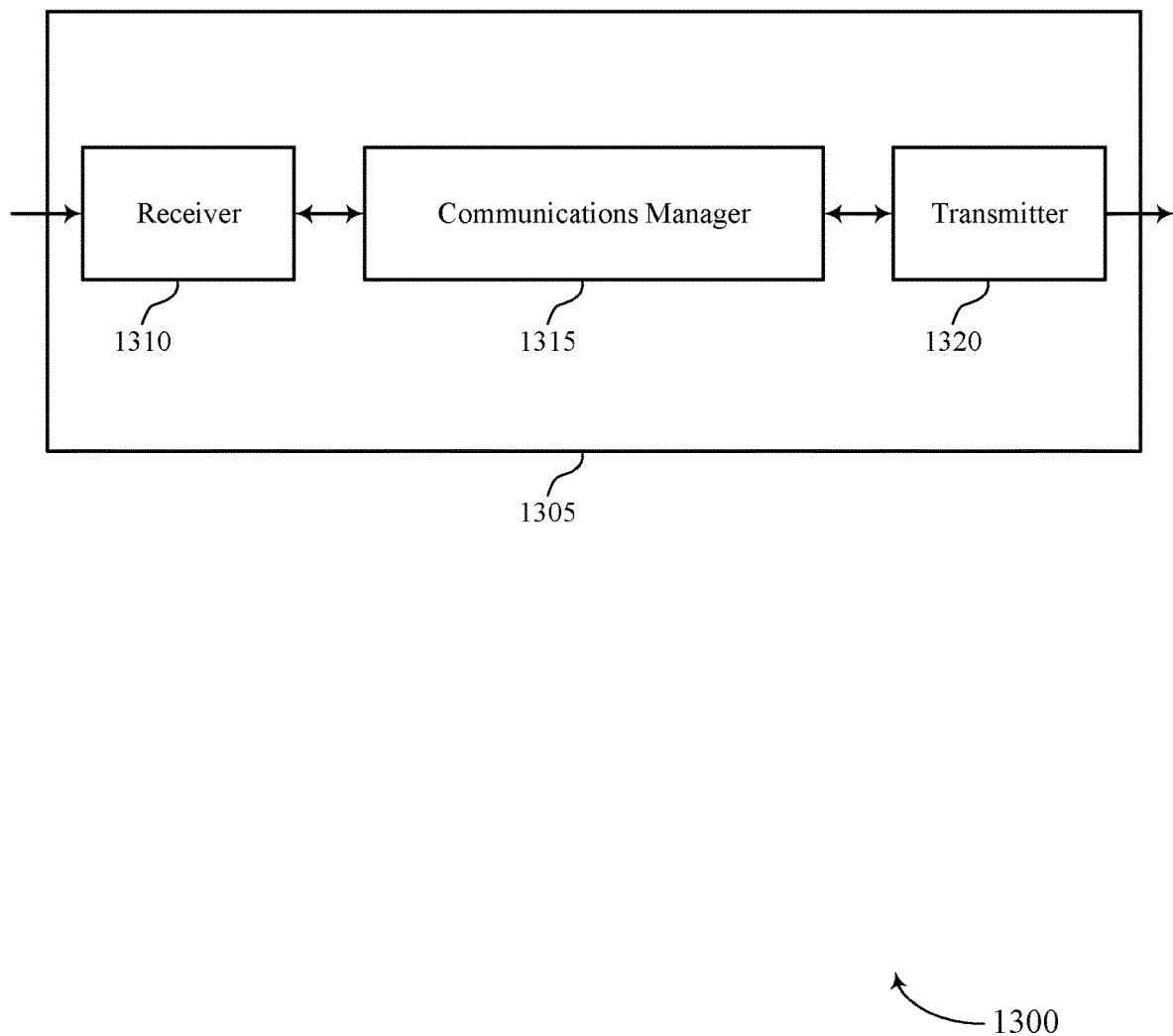
FIGS. 13 and 14 show block diagrams of devices that support techniques for multi-TRP operation via repeaters in accordance with aspects of the present disclosure.

FIG. 13 shows a block diagram 1300 of a device 1305 that supports techniques for multi-TRP operation via repeaters in accordance with aspects of the present disclosure. The device 1305 may be an example of aspects of a device as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques for multi-TRP operation via repeaters, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may communicate between a base station and a UE via a first communication path including the repeater, where the first communication path corresponds to a first end-to-end quality and a second communication path between the base station and UE that does not include the repeater corresponds to a second end-to-end quality, where the first end-to-end quality and the second end-to-end quality each include at least a first hop quality associated with a first hop of the first communication path and the second communication path, relay one or more signals between the UE and the base station, based on the adjusting, according to the communication type, receive, at the repeater in the first communication path, a configuration message from the base station, where receiving the configuration message is based on any combination of the first hop quality of the first end-to-end quality, the first end-to-end quality, a first ratio of the first hop quality for the first end-to-end quality and the first end-to-end quality, the first hop quality of the second end-to-end quality, the second end-to-end quality, and a second ratio of the first hop quality for the second end-to-end quality and the second end-to-end quality, and adjust a configuration status of the repeater, based on the configuration message, to perform a communication type corresponding to communications between the UE and the base station. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure. The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
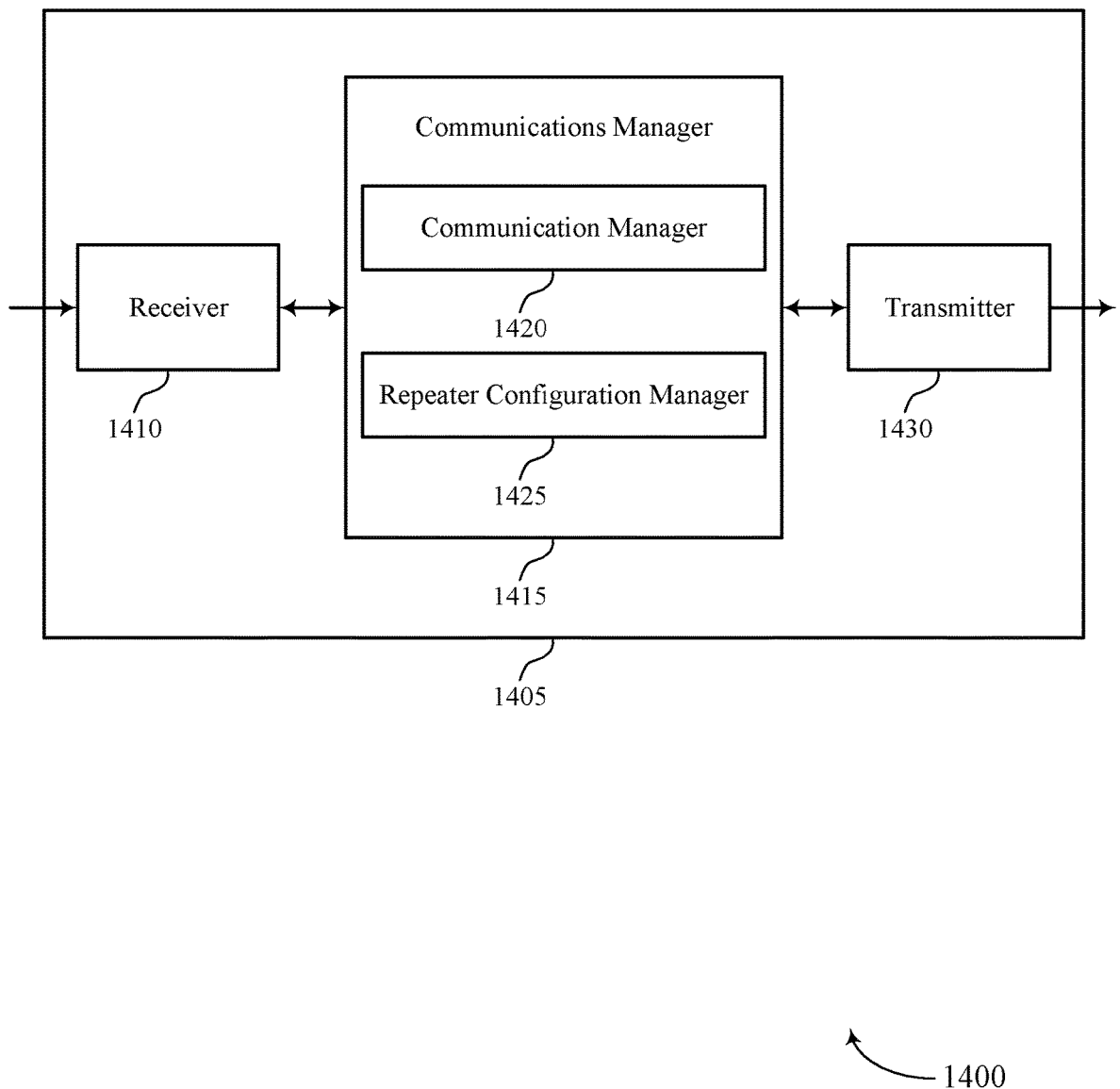

FIG. 14 shows a block diagram 1400 of a device 1405 that supports techniques for multi-TRP operation via repeaters in accordance with aspects of the present disclosure. The device 1405 may be an example of aspects of a device 1305 or a device 115 as described herein. The device 1405 may include a receiver 1410, a communications manager 1415, and a transmitter 1430. The device 1405 may also include a processor. Each of these components may be in communication with one another (e.g., via one or more buses).

The receiver 1410 may receive information such as packets, user data, or control information associated with various information channels (e.g., control channels, data channels, and information related to techniques for multi-TRP operation via repeaters, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a communication manager 1420 and a repeater configuration manager 1425. The communications manager 1415 may be an example of aspects of the communications manager 1610 described herein.

The communication manager 1420 may communicate between a base station and a UE via a first communication path including the repeater, where the first communication path corresponds to a first end-to-end quality and a second communication path between the base station and UE that does not include the repeater corresponds to a second end-to-end quality, where the first end-to-end quality and the second end-to-end quality each include at least a first hop quality associated with a first hop of the first communication path and the second communication path and relay one or more signals between the UE and the base station, based on the adjusting, according to the communication type.

The repeater configuration manager 1425 may receive, at the repeater in the first communication path, a configuration message from the base station, where receiving the configuration message is based on any combination of the first hop quality of the first end-to-end quality, the first end-to-end quality, a first ratio of the first hop quality for the first end-to-end quality and the first end-to-end quality, the first hop quality of the second end-to-end quality, the second end-to-end quality, and a second ratio of the first hop quality for the second end-to-end quality and the second end-to-end quality and adjust a configuration status of the repeater, based on the configuration message, to perform a communication type corresponding to communications between the UE and the base station.

The transmitter 1430 may transmit signals generated by other components of the device 1405. In some examples, the transmitter 1430 may be collocated with a receiver 1410 in a transceiver module. For example, the transmitter 1430 may be an example of aspects of the transceiver 1620 described with reference to FIG. 16. The transmitter 1430 may utilize a single antenna or a set of antennas.

Figure 15:
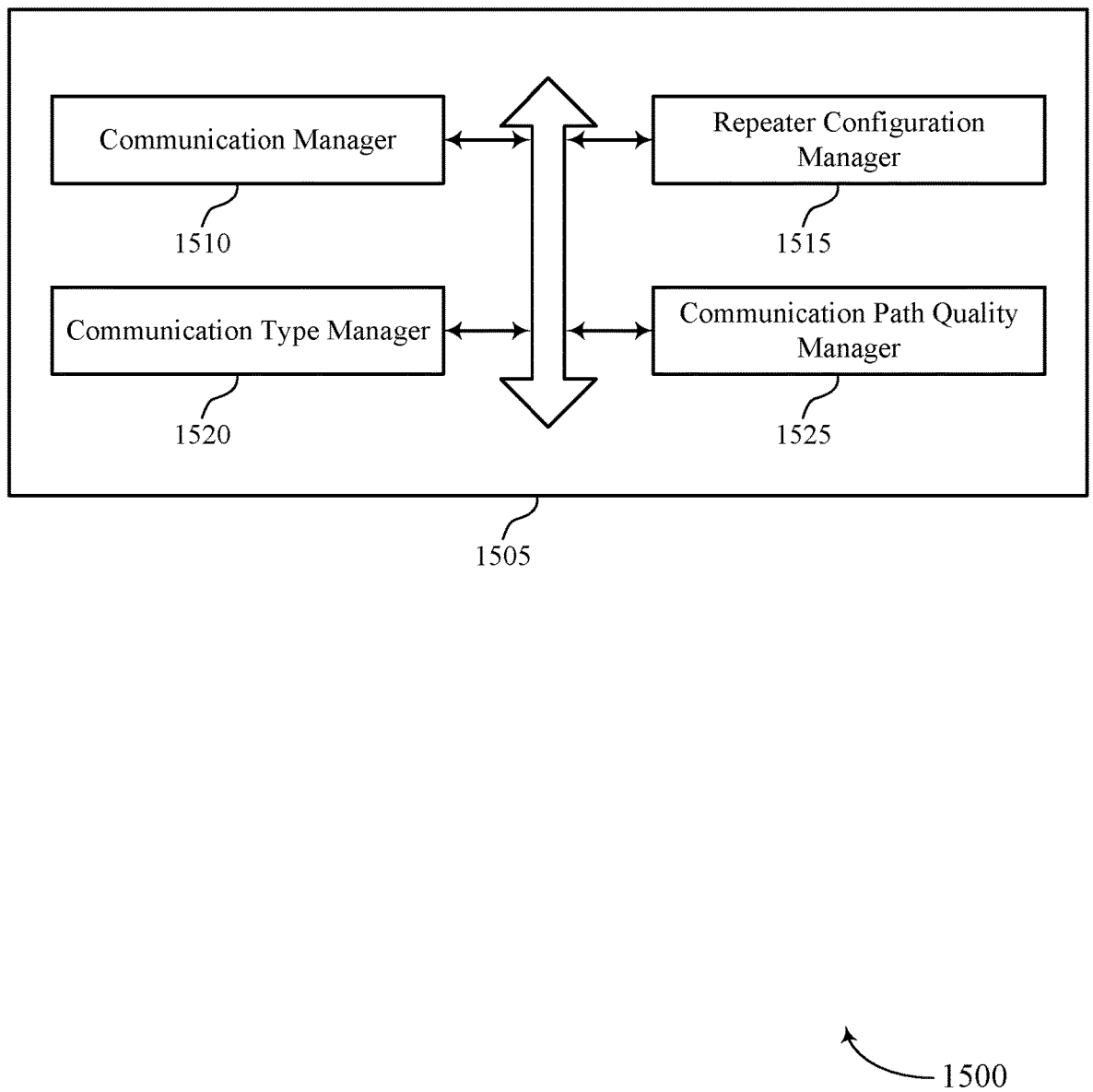
FIG. 15 shows a block diagram of a communications manager that supports techniques for multi-TRP operation via repeaters in accordance with aspects of the present disclosure.

FIG. 15 shows a block diagram 1500 of a communications manager 1505 that supports techniques for multi-TRP operation via repeaters in accordance with aspects of the present disclosure. The communications manager 1505 may be an example of aspects of a communications manager 1315, a communications manager 1415, or a communications manager 1610 described herein. The communications manager 1505 may include a communication manager 1510, a repeater configuration manager 1515, a communication type manager 1520, and a communication path quality manager 1525. Each of these modules may communicate, directly or indirectly, with one another (e.g., via one or more buses).

The communication manager 1510 may communicate between a base station and a UE via a first communication path including the repeater, where the first communication path corresponds to a first end-to-end quality and a second communication path between the base station and UE that does not include the repeater corresponds to a second end-to-end quality, where the first end-to-end quality and the second end-to-end quality each include at least a first hop quality associated with a first hop of the first communication path and the second communication path. In some examples, the communication manager 1510 may relay one or more signals between the UE and the base station, based on the adjusting, according to the communication type. In some examples, relaying, between the UE and the base station, a first copy of a signal, where the communication type includes the first copy of the signal.

The repeater configuration manager 1515 may receive, at the repeater in the first communication path, a configuration message from the base station, where receiving the configuration message is based on any combination of the first hop quality of the first end-to-end quality, the first end-to-end quality, a first ratio of the first hop quality for the first end-to-end quality and the first end-to-end quality, the first hop quality of the second end-to-end quality, the second end-to-end quality, and a second ratio of the first hop quality for the second end-to-end quality and the second end-to-end quality. In some examples, the repeater configuration manager 1515 may adjust a configuration status of the repeater, based on the configuration message, to perform a communication type corresponding to communications between the UE and the base station.

The communication type manager 1520 may relay one or more uplink messages from the UE to the base station, where the communication type includes uplink communications. In some examples, relaying one or more downlink messages from the base station to the UE, where the communication type includes downlink communications. In some examples, relaying, from the base station to the UE, a downlink broadcast signal, a downlink control signal, or a downlink data signal, where the communication type includes a type of downlink signal. In some examples, relaying, between the UE and the base station, a first set of signals, where the communication type includes a first communication stream. In some examples, relaying, between the UE and the base station, a set of one or more signals, where the communication type includes an active communication mode. In some examples, relaying, between the UE and the base station, a subset of a set of one or more signals, the subset having been unsuccessfully transmitted via a different communication path that does not include the repeater, where the communication type includes a backup communication mode. In some cases, the first end-to-end quality for the first communication path includes a first SNR for the first communication path, where the second end-to-end quality for the second communication path includes a second SNR for the second communication path, and where the first hop quality includes a first hop SNR.

Figure 16:
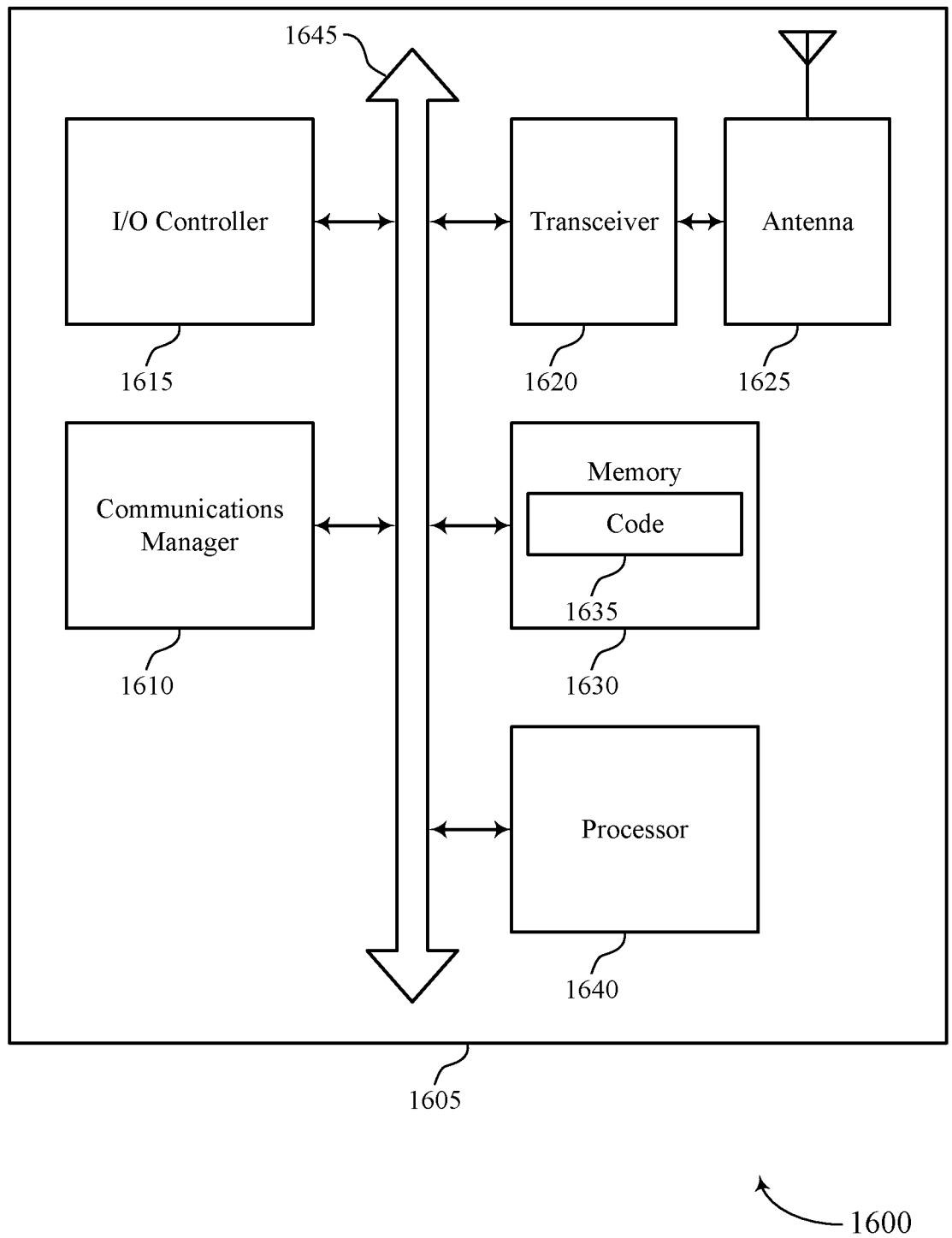
FIG. 16 shows a diagram of a system including a device that supports techniques for multi-TRP operation via repeaters in accordance with aspects of the present disclosure.

FIG. 16 shows a diagram of a system 1600 including a device 1605 that supports techniques for multi-TRP operation via repeaters in accordance with aspects of the present disclosure. The device 1605 may be an example of or include the components of device 1305, device 1405, a repeater 106, or a device as described herein. The device 1605 may include components for bi-directional voice and data communications including components for transmitting and receiving communications, including a communications manager 1610, an I/O controller 1615, a transceiver 1620, an antenna 1625, memory 1630, a processor 1640, and a coding manager 1650. These components may be in electronic communication via one or more buses (e.g., bus 1645).

The communications manager 1610 may communicate between a base station and a UE via a first communication path including the repeater, where the first communication path corresponds to a first end-to-end quality and a second communication path between the base station and UE that does not include the repeater corresponds to a second end-to-end quality, where the first end-to-end quality and the second end-to-end quality each include at least a first hop quality associated with a first hop of the first communication path and the second communication path, relay one or more signals between the UE and the base station, based on the adjusting, according to the communication type, receive, at the repeater in the first communication path, a configuration message from the base station, where receiving the configuration message is based on any combination of the first hop quality of the first end-to-end quality, the first end-to-end quality, a first ratio of the first hop quality for the first end-to-end quality and the first end-to-end quality, the first hop quality of the second end-to-end quality, the second end-to-end quality, and a second ratio of the first hop quality for the second end-to-end quality and the second end-to-end quality, and adjust a configuration status of the repeater, based on the configuration message, to perform a communication type corresponding to communications between the UE and the base station.

The I/O controller 1615 may manage input and output signals for the device 1605. The I/O controller 1615 may also manage peripherals not integrated into the device 1605. In some cases, the I/O controller 1615 may represent a physical connection or port to an external peripheral. In some cases, the I/O controller 1615 may utilize an operating system such as iOS®, ANDROID®, MS-DOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some cases, the I/O controller 1615 may be implemented as part of a processor. In some cases, a user may interact with the device 1605 via the I/O controller 1615 or via hardware components controlled by the I/O controller 1615.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM and ROM. The memory 1630 may store computer-readable, computer-executable code 1635 including instructions that, when executed, cause the processor to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting techniques for multi-TRP operation via repeaters).

The processor 1640 of the device 1605 (e.g., controlling the receiver 1310, the transmitter 1320, or the transmitter 920) may increase signaling reliability, improve system efficiency, and decrease the likelihood of system latency based on selecting most efficiency communication paths. In some examples, the processor 940 of the device 905 may receive configuration information from a base station 105, and communicate with the base station 105 and UE 115. The improvements in signaling reliability and increased system efficiency may further increase power efficiency at the device 905 (for example, by reducing or eliminating unnecessary or failed processing of transmissions, etc.).

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
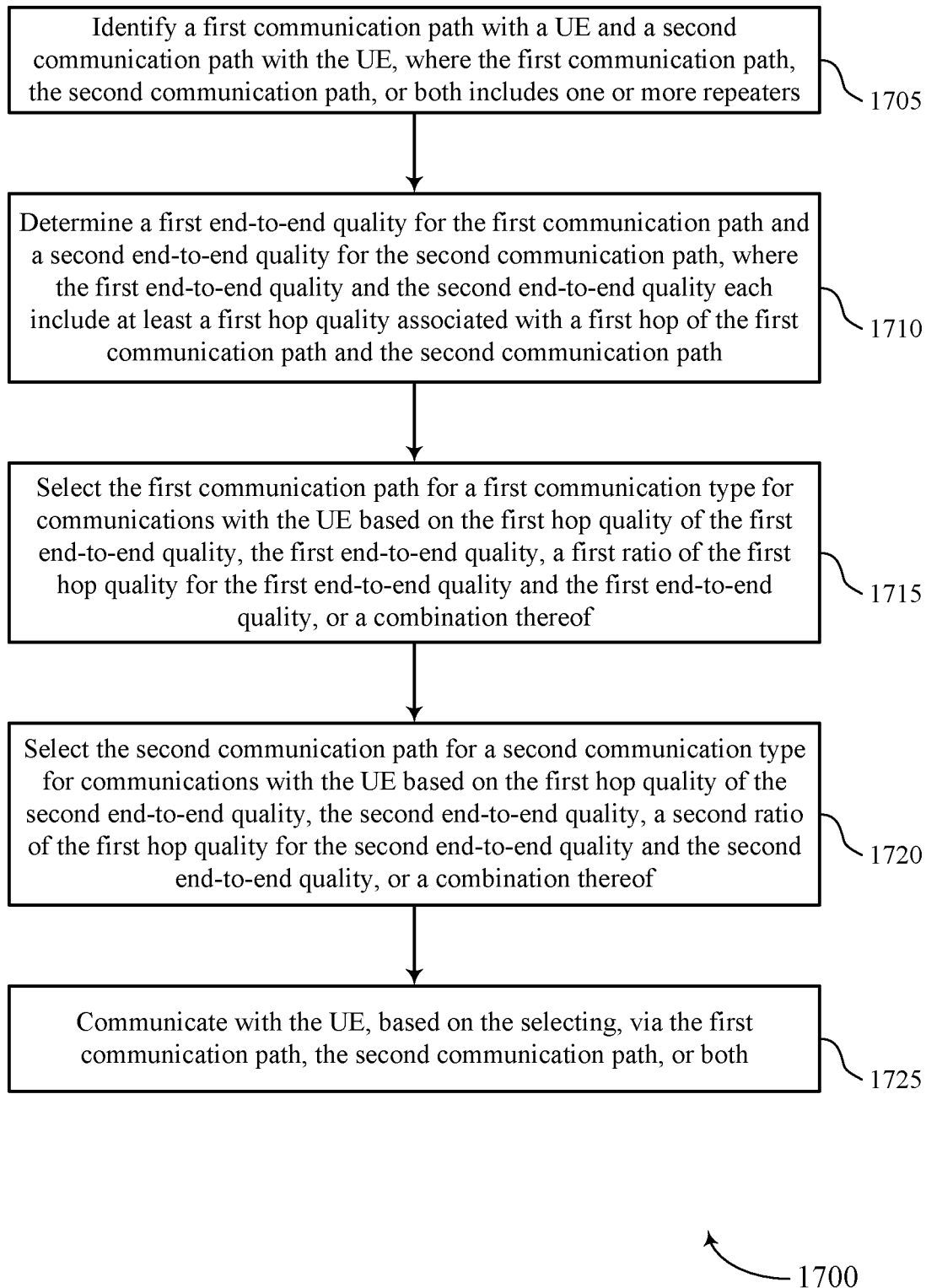
FIGS. 17 through 20 show flowcharts illustrating methods that support techniques for multi-TRP operation via repeaters in accordance with aspects of the present disclosure.

FIG. 17 shows a flowchart illustrating a method 1700 that supports techniques for multi-TRP operation via repeaters in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1705, the base station may identify a first communication path with a UE and a second communication path with the UE, where the first communication path, the second communication path, or both includes one or more repeaters. The operations of 1705 may be performed according to the methods described herein. In some examples, aspects of the operations of 1705 may be performed by a communication path identification manager as described with reference to FIGS. 9 through 12.

At 1710, the base station may determine a first end-to-end quality for the first communication path and a second end-to-end quality for the second communication path, where the first end-to-end quality and the second end-to-end quality each include at least a first hop quality associated with a first hop of the first communication path and the second communication path. The operations of 1710 may be performed according to the methods described herein. In some examples, aspects of the operations of 1710 may be performed by a communication path quality manager as described with reference to FIGS. 9 through 12.

At 1715, the base station may select the first communication path for a first communication type for communications with the UE based on the first hop quality of the first end-to-end quality, the first end-to-end quality, a first ratio of the first hop quality for the first end-to-end quality and the first end-to-end quality, or a combination thereof. The operations of 1715 may be performed according to the methods described herein. In some examples, aspects of the operations of 1715 may be performed by a communication path selection manager as described with reference to FIGS. 9 through 12.

At 1720, the base station may select the second communication path for a second communication type for communications with the UE based on the first hop quality of the second end-to-end quality, a second end-to-end quality, a second ratio of the first hop quality for the second end-to-end quality and the second end-to-end quality, or a combination thereof. The operations of 1720 may be performed according to the methods described herein. In some examples, aspects of the operations of 1720 may be performed by a communication path selection manager as described with reference to FIGS. 9 through 12.

At 1725, the base station may communicate with the UE, based on the selecting, via the first communication path, the second communication path, or both. The operations of 1725 may be performed according to the methods described herein. In some examples, aspects of the operations of 1725 may be performed by a communication manager as described with reference to FIGS. 9 through 12.

Figure 18:
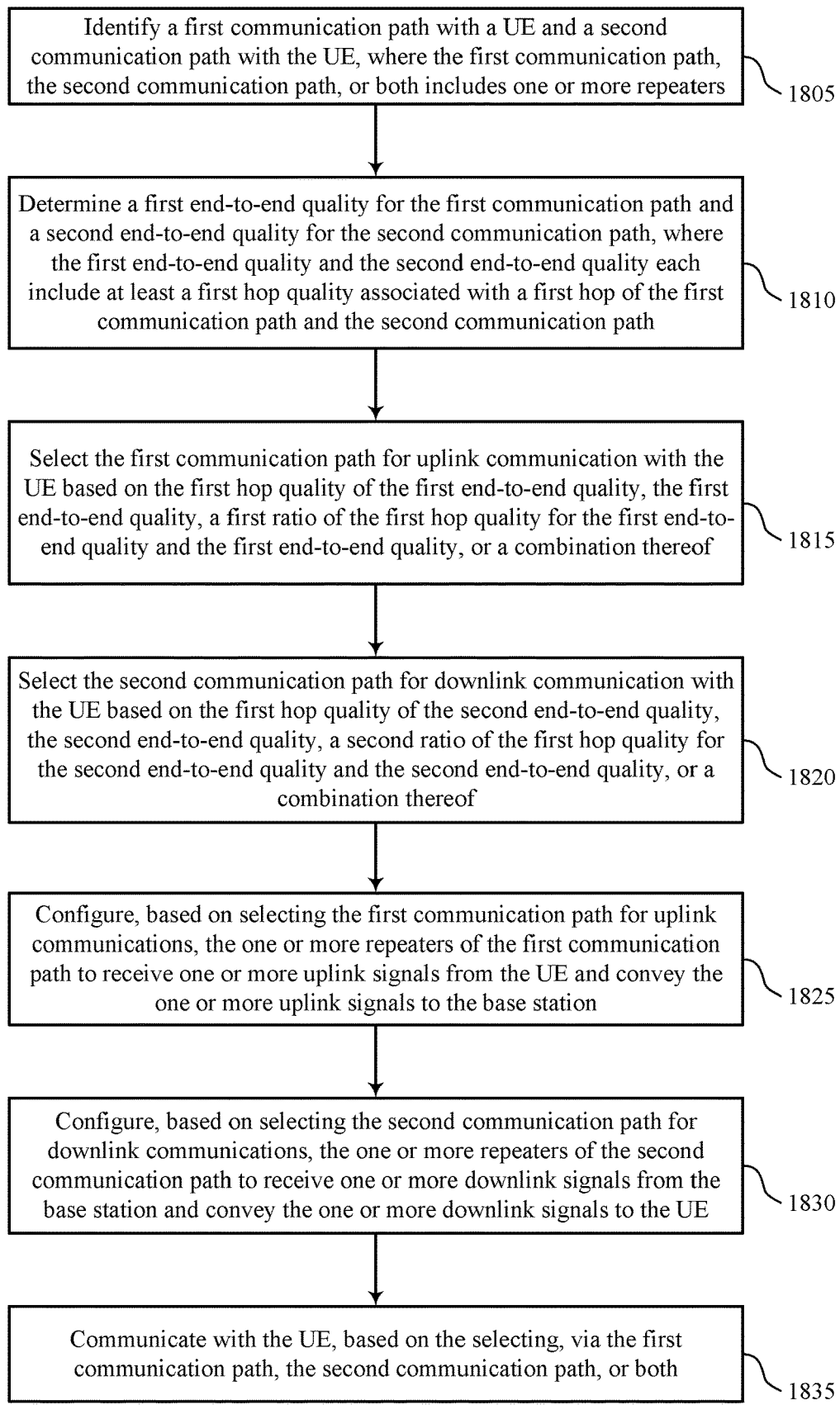

FIG. 18 shows a flowchart illustrating a method 1800 that supports techniques for multi-TRP operation via repeaters in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1805, the base station may identify a first communication path with a UE and a second communication path with the UE, where the first communication path, the second communication path, or both includes one or more repeaters. The operations of 1805 may be performed according to the methods described herein. In some examples, aspects of the operations of 1805 may be performed by a communication path identification manager as described with reference to FIGS. 9 through 12.

At 1810, the base station may determine a first end-to-end quality for the first communication path and a second end-to-end quality for the second communication path, where the first end-to-end quality and the second end-to-end quality each include at least a first hop quality associated with a first hop of the first communication path and the second communication path. The operations of 1810 may be performed according to the methods described herein. In some examples, aspects of the operations of 1810 may be performed by a communication path quality manager as described with reference to FIGS. 9 through 12.

At 1815, the base station may select the first communication path for uplink communication with the UE based on the first hop quality of the first end-to-end quality, the first end-to-end quality, a first ratio of the first hop quality for the first end-to-end quality and the first end-to-end quality, or a combination thereof. The operations of 1815 may be performed according to the methods described herein. In some examples, aspects of the operations of 1815 may be performed by a communication path selection manager as described with reference to FIGS. 9 through 12.

At 1820, the base station may select the second communication path for downlink communication with the UE based on the first hop quality of the second end-to-end quality, a second end-to-end quality, a second ratio of the first hop quality for the second end-to-end quality and the second end-to-end quality, or a combination thereof. The operations of 1820 may be performed according to the methods described herein. In some examples, aspects of the operations of 1820 may be performed by a communication path selection manager as described with reference to FIGS. 9 through 12.

At 1825, the base station may configure, based on selecting the first communication path for uplink communications, the one or more repeaters of the first communication path to receive one or more uplink signals from the UE and convey the one or more uplink signals to the base station. The operations of 1825 may be performed according to the methods described herein. In some examples, aspects of the operations of 1825 may be performed by a repeater configuration manager as described with reference to FIGS. 9 through 12.

At 1830, the base station may configure, based on selecting the second communication path for downlink communications, the one or more repeaters of the second communication path to receive one or more downlink signals from the base station and convey the one or more downlink signals to the UE. The operations of 1830 may be performed according to the methods described herein. In some examples, aspects of the operations of 1830 may be performed by a repeater configuration manager as described with reference to FIGS. 9 through 12.

At 1835, the base station may communicate with the UE, based on the selecting, via the first communication path, the second communication path, or both. The operations of 1835 may be performed according to the methods described herein. In some examples, aspects of the operations of 1835 may be performed by a communication manager as described with reference to FIGS. 9 through 12.

Figure 19:
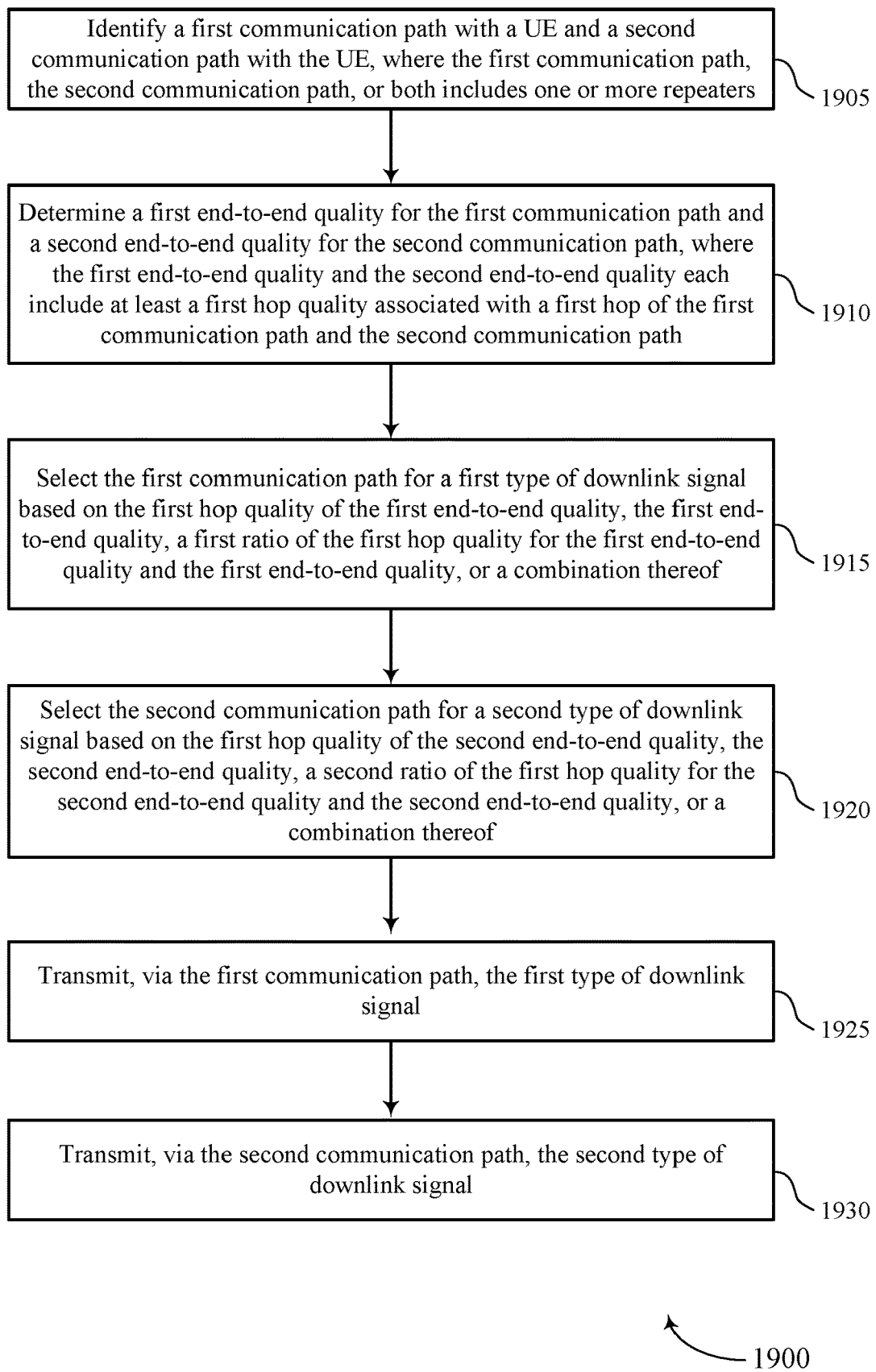

FIG. 19 shows a flowchart illustrating a method 1900 that supports techniques for multi-TRP operation via repeaters in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1905, the base station may identify a first communication path with a UE and a second communication path with the UE, where the first communication path, the second communication path, or both includes one or more repeaters. The operations of 1905 may be performed according to the methods described herein. In some examples, aspects of the operations of 1905 may be performed by a communication path identification manager as described with reference to FIGS. 9 through 12.

At 1910, the base station may determine a first end-to-end quality for the first communication path and a second end-to-end quality for the second communication path, where the first end-to-end quality and the second end-to-end quality each include at least a first hop quality associated with a first hop of the first communication path and the second communication path. The operations of 1910 may be performed according to the methods described herein. In some examples, aspects of the operations of 1910 may be performed by a communication path quality manager as described with reference to FIGS. 9 through 12.

At 1915, the base station may select the first communication path for a first type of downlink signal based on the first hop quality of the first end-to-end quality, the first end-to-end quality, a first ratio of the first hop quality for the first end-to-end quality and the first end-to-end quality, or a combination thereof. The operations of 1915 may be performed according to the methods described herein. In some examples, aspects of the operations of 1915 may be performed by a communication path selection manager as described with reference to FIGS. 9 through 12.

At 1920, the base station may select the second communication path for a second type of downlink signal based on the first hop quality of the second end-to-end quality, a second end-to-end quality, a second ratio of the first hop quality for the second end-to-end quality and the second end-to-end quality, or a combination thereof. The operations of 1920 may be performed according to the methods described herein. In some examples, aspects of the operations of 1920 may be performed by a communication path selection manager as described with reference to FIGS. 9 through 12.

At 1925, the base station may transmit, via the first communication path, the first type of downlink signal. The operations of 1925 may be performed according to the methods described herein. In some examples, aspects of the operations of 1925 may be performed by a communication manager as described with reference to FIGS. 9 through 12.

At 1930, the base station may transmit, via the second communication path, the second type of downlink signal. The operations of 1930 may be performed according to the methods described herein. In some examples, aspects of the operations of 1930 may be performed by a communication manager as described with reference to FIGS. 9 through 12.

Figure 20:
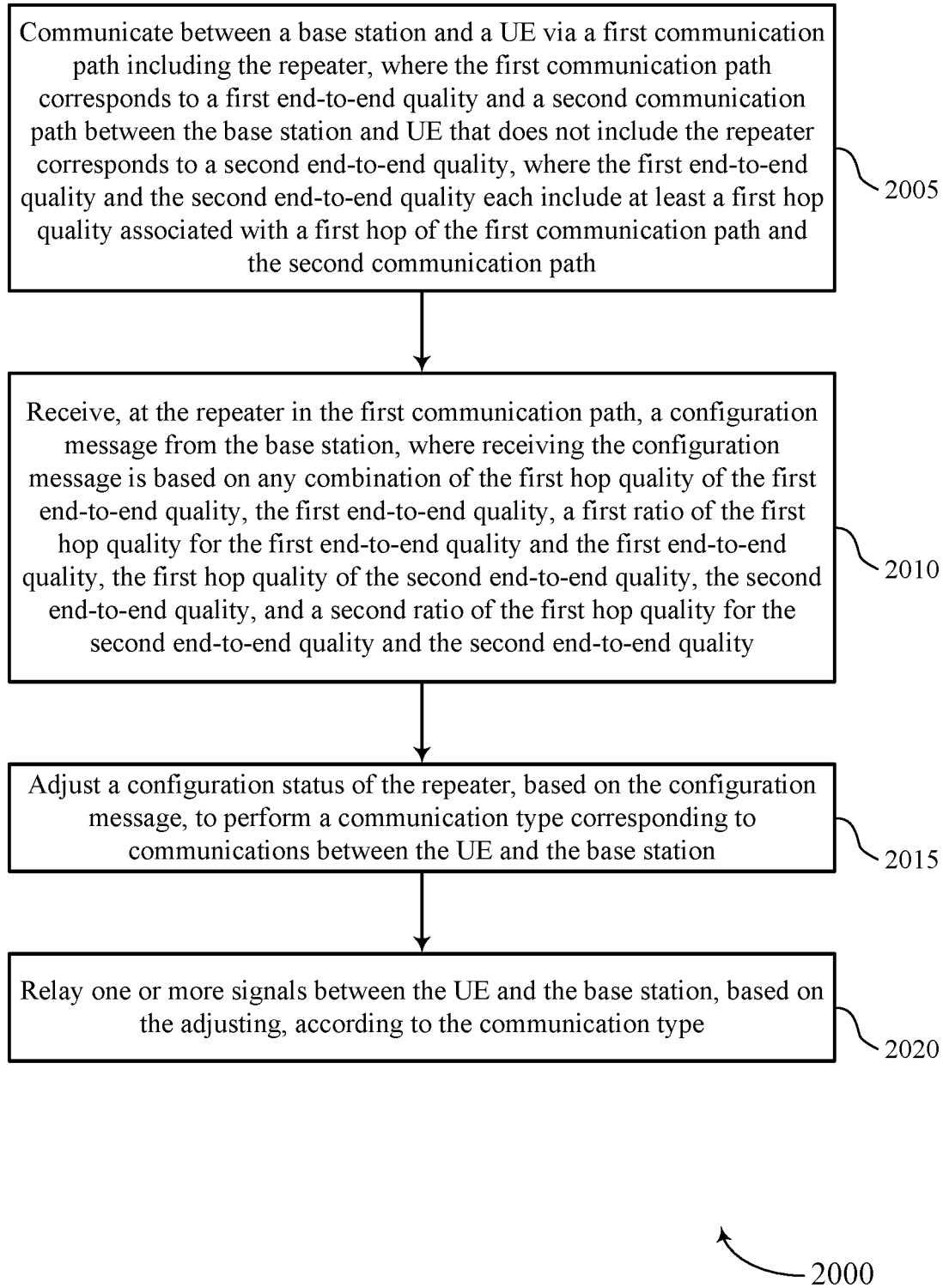

FIG. 20 shows a flowchart illustrating a method 2000 that supports techniques for multi-TRP operation via repeaters in accordance with aspects of the present disclosure. The operations of method 2000 may be implemented by a device or its components as described herein. For example, the operations of method 2000 may be performed by a communications manager as described with reference to FIGS. 13 through 16. In some examples, a device may execute a set of instructions to control the functional elements of the device to perform the functions described below. Additionally, or alternatively, a device may perform aspects of the functions described below using special-purpose hardware.

At 2005, the device may communicate between a base station and a UE via a first communication path including the repeater, where the first communication path corresponds to a first end-to-end quality and a second communication path between the base station and UE that does not include the repeater corresponds to a second end-to-end quality, where the first end-to-end quality and the second end-to-end quality each include at least a first hop quality associated with a first hop of the first communication path and the second communication path. The operations of 2005 may be performed according to the methods described herein. In some examples, aspects of the operations of 2005 may be performed by a communication manager as described with reference to FIGS. 13 through 16.

At 2010, the device may receive, at the repeater in the first communication path, a configuration message from the base station, where receiving the configuration message is based on any combination of the first hop quality of the first end-to-end quality, the first end-to-end quality, a first ratio of the first hop quality for the first end-to-end quality and the first end-to-end quality, the first hop quality of the second end-to-end quality, the second end-to-end quality, and a second ratio of the first hop quality for the second end-to-end quality and the second end-to-end quality. The operations of 2010 may be performed according to the methods described herein. In some examples, aspects of the operations of 2010 may be performed by a repeater configuration manager as described with reference to FIGS. 13 through 16.

At 2015, the device may adjust a configuration status of the repeater, based on the configuration message, to perform a communication type corresponding to communications between the UE and the base station. The operations of 2015 may be performed according to the methods described herein. In some examples, aspects of the operations of 2015 may be performed by a repeater configuration manager as described with reference to FIGS. 13 through 16.

At 2020, the device may relay one or more signals between the UE and the base station, based on the adjusting, according to the communication type. The operations of 2020 may be performed according to the methods described herein. In some examples, aspects of the operations of 2020 may be performed by a communication manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   identifying a first communication path with a user equipment (UE) and a second communication path with the UE, wherein the first communication path, the second communication path, or both comprises one or more repeaters;
   determining a first end-to-end quality for the first communication path and a second end-to-end quality for the second communication path, wherein the first end-to-end quality and the second end-to-end quality each comprise at least a first hop quality associated with a first hop of the first communication path and the second communication path;
   determining that the first end-to-end quality, a first ratio of the first hop quality for the first end-to-end quality and the first end-to-end quality, or a combination thereof, is higher than the second end-to-end quality, a second ratio of the first hop quality for the second end-to-end quality and the second end-to-end quality, or a combination thereof;
   selecting the first communication path for a first communication type for communications with the UE based at least in part on the first hop quality of the first end-to-end quality, the first ratio, or a combination thereof, wherein selecting the first communication path for the first communication type is based at least in part on determining that the first end-to-end quality, the first ratio, or a combination thereof, is higher than the second end-to-end quality, the second ratio, or a combination thereof;
   selecting the second communication path for a second communication type for communications with the UE based at least in part on the first hop quality of the second end-to-end quality, the second ratio, or a combination thereof, wherein selecting the second communication path for the second communication type is based at least in part on determining that the first end-to-end quality, the first ratio, or a combination thereof, is higher than the second end-to-end quality, the second ratio, or a combination thereof; and
   communicating with the UE, based at least in part on the selecting, via the first communication path, the second communication path, or both.

2. The method of claim 1, further comprising:
   selecting the first communication path for uplink communications, wherein the first communication type comprises uplink communications; and
   selecting the second communication path for downlink communications, wherein the second communication type comprises downlink communications.

3. The method of claim 2, wherein both the first communication path and the second communication path comprise the one or more repeaters, further comprising:
   configuring, based at least in part on selecting the first communication path for uplink communications, the one or more repeaters of the first communication path to receive one or more uplink signals from the UE and convey the one or more uplink signals to an access network entity; and
   configuring, based at least in part on selecting the second communication path for downlink communications, the one or more repeaters of the second communication path to receive one or more downlink signals from the access network entity and convey the one or more downlink signals to the UE.

4. The method of claim 1, further comprising:
   selecting the first communication path for a first type of downlink signal, wherein the first communication type comprises the first type of downlink signal; and
   selecting the second communication path for a second type of downlink signal, wherein the second communication type comprises the second type of downlink signal.

5. The method of claim 4, further comprising:
   transmitting, via the first communication path, the first type of downlink signal; and
   transmitting, via the second communication path, the second type of downlink signal.

6. The method of claim 4, wherein the first type of downlink signal comprises data signaling.

7. The method of claim 4, wherein the second type of downlink signal comprises broadcast signaling or control signaling.

8. The method of claim 4, wherein the second communication path comprises the one or more repeaters, and wherein the first communication path comprises a direct link between an access network entity and the UE.

9. The method of claim 1, further comprising:
   selecting the first communication path for a first signal, wherein the first communication type comprises a first copy of the first signal; and
   selecting the second communication path for the first signal, wherein the second communication type comprises a second copy of the first signal.

10. The method of claim 1, further comprising:
    selecting the first communication path for a first set of signals, wherein the first communication type comprises a first communication stream; and
    selecting the first communication path for a second set of signals that are different from the first set of signals, wherein the second communication type comprises a second communication stream.

11. The method of claim 1, further comprising:
    selecting the first communication path for communicating with the UE, wherein the first communication type comprises an active communication mode; and
    selecting the second communication path for backup communications when communications via the first communication path fail, wherein the second communication type comprises a backup communication mode.

12. The method of claim 1, wherein:
determining the first end-to-end quality for the first communication path comprises determining a first signal-to-noise ratio (SNR) for the first communication path, wherein determining the second end-to-end quality for the second communication path comprises determining a second SNR for the second communication path, and wherein the first hop quality comprises a first hop SNR.

13. A method for wireless communications at a repeater, comprising:
communicating between an access network entity and a user equipment (UE) via a first communication path comprising the repeater, wherein the first communication path corresponds to a first end-to-end quality and a second communication path between the access network entity and UE that does not include the repeater corresponds to a second end-to-end quality, wherein the first end-to-end quality and the second end-to-end quality each comprise at least a first hop quality associated with a first hop of the first communication path and the second communication path;
receiving, at the repeater in the first communication path, a configuration message from the access network entity, wherein receiving the configuration message is based at least in part on any combination of the first hop quality of the first end-to-end quality, the first end-to-end quality, a first ratio of the first hop quality for the first end-to-end quality and the first end-to-end quality, the first hop quality of the second end-to-end quality, the second end-to-end quality, and a second ratio of the first hop quality for the second end-to-end quality and the second end-to-end quality;
adjusting a configuration status of the repeater, based at least in part on the configuration message, to perform a communication type corresponding to communications between the UE and the access network entity; and
relaying one or more signals between the UE and the access network entity, based at least in part on the adjusting, according to the communication type.

14. The method of claim 13, further comprising:
relaying one or more uplink messages from the UE to the access network entity, wherein the communication type comprises uplink communications.

15. The method of claim 13, further comprising:
relaying one or more downlink messages from the access network entity to the UE, wherein the communication type comprises downlink communications.

16. The method of claim 13, further comprising:
relaying, from the access network entity to the UE, a downlink broadcast signal, a downlink control signal, or a downlink data signal, wherein the communication type comprises a type of downlink signal.

17. The method of claim 13, further comprising:
relaying, between the UE and the access network entity, a first copy of a signal, wherein the communication type comprises the first copy of the signal.

18. The method of claim 13, further comprising:
relaying, between the UE and the access network entity, a first set of signals, wherein the communication type comprises a first communication stream.

19. The method of claim 13, further comprising:
relaying, between the UE and the access network entity, a set of one or more signals, wherein the communication type comprises an active communication mode.

20. The method of claim 13, further comprising:
relaying, between the UE and the access network entity, a subset of a set of one or more signals, the subset having been unsuccessfully transmitted via a different communication path that does not include the repeater, wherein the communication type comprises a backup communication mode.

21. The method of claim 13, wherein the first end-to-end quality for the first communication path comprises a first signal-to-noise ratio (SNR) for the first communication path, wherein the second end-to-end quality for the second communication path comprises a second SNR for the second communication path, and wherein the first hop quality comprises a first hop SNR.

22. An apparatus for wireless communications, comprising:
a processor,
memory coupled with the processor; and
instructions stored in the memory and executable by the processor to cause the apparatus to:
identify a first communication path with a user equipment (UE) and a second communication path with the UE, wherein the first communication path, the second communication path, or both comprises one or more repeaters;
determine a first end-to-end quality for the first communication path and a second end-to-end quality for the second communication path, wherein the first end-to-end quality and the second end-to-end quality each comprise at least a first hop quality associated with a first hop of the first communication path and the second communication path;
determine that the first end-to-end quality, a first ratio of the first hop quality for the first end-to-end quality and the first end-to-end quality, or a combination thereof, is higher than the second end-to-end quality, a second ratio of the first hop quality for the second end-to-end quality and the second end-to-end quality, or a combination thereof;
select the first communication path for a first communication type for communications with the UE based at least in part on the first hop quality of the first end-to-end quality, the first ratio, or a combination thereof, wherein selecting the first communication path for the first communication type is based at least in part on determining that the first end-to-end quality, the first ratio, or a combination thereof, is higher than the second end-to-end quality, the second ratio, or a combination thereof;
select the second communication path for a second communication type for communications with the UE based at least in part on the first hop quality of the second end-to-end quality, the second ratio, or a combination thereof, wherein selecting the second communication path for the second communication type is based at least in part on determining that the first end-to-end quality, the first ratio, or a combination thereof, is higher than the second end-to-end quality, the second ratio, or a combination thereof; and
communicate with the UE, based at least in part on the selecting, via the first communication path, the second communication path, or both.

23. The apparatus of claim 22, wherein the instructions are further executable by the processor to cause the apparatus to:
- select the first communication path for uplink communications, wherein the first communication type comprises uplink communications; and
- select the second communication path for downlink communications, wherein the second communication type comprises downlink communications.

24. The apparatus of claim 22, wherein the instructions are further executable by the processor to cause the apparatus to:
- select the first communication path for a first type of downlink signal, wherein the first communication type comprises the first type of downlink signal; and
- select the second communication path for a second type of downlink signal, wherein the second communication type comprises the second type of downlink signal.

25. The apparatus of claim 22, wherein the instructions are further executable by the processor to cause the apparatus to:
- select the first communication path for a first signal, wherein the first communication type comprises a first copy of the first signal; and
- select the second communication path for the first signal, wherein the second communication type comprises a second copy of the first signal.

26. The apparatus of claim 22, wherein the instructions are further executable by the processor to cause the apparatus to:
- select the first communication path for a first set of signals, wherein the first communication type comprises a first communication stream; and
- select the first communication path for a second set of signals that are different from the first set of signals, wherein the second communication type comprises a second communication stream.

27. The apparatus of claim 22, wherein the instructions are further executable by the processor to cause the apparatus to:
- select the first communication path for communicating with the UE, wherein the first communication type comprises an active communication mode; and
- select the second communication path for backup communications when communications via the first communication paths fail, wherein the second communication type comprises a backup communication mode.

28. An apparatus for wireless communications at a repeater, comprising:
- a processor,
- memory coupled with the processor; and
- instructions stored in the memory and executable by the processor to cause the apparatus to:
- communicate between an access network entity and a user equipment (UE) via a first communication path comprising the repeater, wherein the first communication path corresponds to a first end-to-end quality and a second communication path between the access network entity and UE that does not include the repeater corresponds to a second end-to-end quality, wherein the first end-to-end quality and the second end-to-end quality each comprise at least a first hop quality associated with a first hop of the first communication path and the second communication path;
- receive, at the repeater in the first communication path, a configuration message from the access network entity, wherein receiving the configuration message is based at least in part on any combination of the first hop quality of the first end-to-end quality, the first end-to-end quality, a first ratio of the first hop quality for the first end-to-end quality and the first end-to-end quality, the first hop quality of the second end-to-end quality, the second end-to-end quality, and a second ratio of the first hop quality for the second end-to-end quality and the second end-to-end quality;
- adjust a configuration status of the repeater, based at least in part on the configuration message, to perform a communication type corresponding to communications between the UE and the access network entity; and
- relay one or more signals between the UE and the access network entity, based at least in part on the adjusting, according to the communication type.

29. The apparatus of claim 28, wherein the instructions are further executable by the processor to cause the apparatus to:
- relay one or more uplink messages from the UE to the access network entity, wherein the communication type comprises uplink communications.

* * * * *